(12) United States Patent
Avery

(10) Patent No.: US 12,220,075 B2
(45) Date of Patent: Feb. 11, 2025

(54) CONVERTIBLE METAL BACKINGS AND RELATED METHODS

(71) Applicant: Avertech, Inc., Mission Viejo, CA (US)

(72) Inventor: Neal H. Avery, Mission Viejo, CA (US)

(73) Assignee: Avertech, Inc., Misison Viejo, CA (US)

( * ) Notice: Subject to any disclaimer, the term of this patent is extended or adjusted under 35 U.S.C. 154(b) by 0 days.

(21) Appl. No.: 18/335,047

(22) Filed: Jun. 14, 2023

(65) Prior Publication Data

US 2023/0320509 A1    Oct. 12, 2023

Related U.S. Application Data

(63) Continuation of application No. 18/057,322, filed on Nov. 21, 2022, now Pat. No. 11,712,125, which is a
(Continued)

(51) Int. Cl.
*A47G 29/08* (2006.01)
*A47G 29/087* (2006.01)
(Continued)

(52) U.S. Cl.
CPC ............ *A47G 29/087* (2013.01); *B29C 65/50* (2013.01); *B43K 8/02* (2013.01); *B43K 25/00* (2013.01);
(Continued)

(58) Field of Classification Search
CPC ........ A47G 29/087; A47G 1/17; A47G 1/175; B29C 65/50; B43K 8/02; B43K 25/00;
(Continued)

(56) References Cited

U.S. PATENT DOCUMENTS 3,257,497 A * 6/1966 Marston ................. H01R 13/72
                                                220/242
5,301,823 A * 4/1994 Kingery ................ A47F 5/0876
                                                211/175
(Continued)

FOREIGN PATENT DOCUMENTS

EP          3537414 A1    9/2019
WO      2007001901 A1    1/2007

OTHER PUBLICATIONS

International Search Report and Written Opinion on corresponding PCT application (PCT/US2022/052427) from International Searching Authority (EPO) dated Mar. 29, 2023.
(Continued)

*Primary Examiner* — Ko H Chan
(74) *Attorney, Agent, or Firm* — Alumen IP Law PC

(57) ABSTRACT

A substrate usable with a double-side adhesive strip to suspend the substrate to a wall surface. The substrate can have one or more access holes located within an outer perimeter of the substrate. Each access hole has an inner perimeter inwardly of the outer perimeter that is sized and shaped to allow a tab of the double-sided adhesive strip to be extracted through the inner perimeter, after the substrate is suspended on the wall surface. Various articles can attach to the suspended substrate, such as through magnetic attachment, a hook, or a shelf.

23 Claims, 24 Drawing Sheets

Related U.S. Application Data continuation of application No. 17/651,760, filed on Feb. 18, 2022, now Pat. No. 11,529,010.

(60) Provisional application No. 63/295,257, filed on Dec. 30, 2021.

(51) Int. Cl.
| | | |
|---|---|---|
| *B29C 65/50* | (2006.01) | |
| *B43K 8/02* | (2006.01) | |
| *B43K 25/00* | (2006.01) | |
| *B43L 1/00* | (2006.01) | |
| *B65D 85/00* | (2006.01) | |
| *F16B 1/00* | (2006.01) | |
| *F16B 45/00* | (2006.01) | |

(52) U.S. Cl.
CPC .............. *B43L 1/008* (2013.01); *B65D 85/00* (2013.01); *F16B 1/00* (2013.01); *F16B 45/00* (2013.01); *F16B 2200/83* (2023.08)

(58) Field of Classification Search
CPC . B43L 1/008; B65D 85/00; F16B 1/00; F16B 45/00; F16B 2001/0035; F16B 11/006; Y10T 156/10; Y10T 156/18; Y10T 428/28
See application file for complete search history.

(56) References Cited

U.S. PATENT DOCUMENTS

| | | | |
|---|---|---|---|
| 5,507,464 A | 4/1996 | Hamerski et al. | |
| 6,120,867 A | 9/2000 | Hamerski et al. | |
| 6,187,404 B1* | 2/2001 | Schumann | A47G 1/175 428/68 |
| 6,503,097 B2* | 1/2003 | Archambault | H01R 13/60 439/4 |
| 6,572,945 B2 | 6/2003 | Bries et al. | |
| 6,811,126 B2 | 11/2004 | Johansson et al. | |
| 7,172,456 B1* | 2/2007 | Nagy | H01R 13/72 439/4 |
| 7,540,456 B2 | 6/2009 | Thompson | |
| 9,115,845 B2 | 8/2015 | Madigan | |
| 9,466,954 B1* | 10/2016 | Stevens | H02B 1/34 |
| 9,551,454 B2* | 1/2017 | Lipke | F16M 13/02 |
| 9,920,783 B2* | 3/2018 | Runge | B29C 65/48 |
| 9,936,807 B2* | 4/2018 | Ryan | A63B 71/0036 |
| 10,221,883 B2 | 3/2019 | Demsky | |
| 10,391,811 B1 | 8/2019 | Geldard | |
| 10,479,586 B2 | 11/2019 | Goldfarb | |
| 10,624,474 B2 | 4/2020 | Taratuta | |
| 11,116,334 B2 | 9/2021 | Petersen | |
| 2003/0070998 A1 | 4/2003 | Bulka | |
| 2004/0123503 A1 | 7/2004 | Pitzen | |
| 2004/0188580 A1 | 9/2004 | Ryu et al. | |
| 2005/0101193 A1* | 5/2005 | Godard | H01R 13/6683 439/652 |
| 2007/0099510 A1 | 5/2007 | Beno | |
| 2007/0141546 A1 | 6/2007 | Kang et al. | |
| 2007/0257165 A1 | 11/2007 | Newbould et al. | |
| 2007/0295436 A1 | 12/2007 | Joseph | |
| 2009/0193674 A1* | 8/2009 | Megahed | A47G 1/205 33/666 |
| 2010/0164434 A1 | 7/2010 | Cacioppo et al. | |
| 2012/0032043 A1 | 2/2012 | McGreevy et al. | |
| 2012/0153102 A1 | 6/2012 | Thompson | |
| 2013/0264925 A1* | 10/2013 | Kling | A47G 1/175 312/293.3 |
| 2016/0022037 A1* | 1/2016 | Ryan | A47B 95/008 211/85.7 |
| 2016/0290555 A1 | 10/2016 | Lee et al. | |
| 2022/0000287 A1 | 1/2022 | Levis | |

OTHER PUBLICATIONS

Non-Final Office Action on corresponding (U.S. Appl. No. 17/651,760) dated Aug. 18, 2022.
Notice of Allowance on co-pending (U.S. Appl. No. 18/057,322) dated Mar. 14, 2023.

* cited by examiner

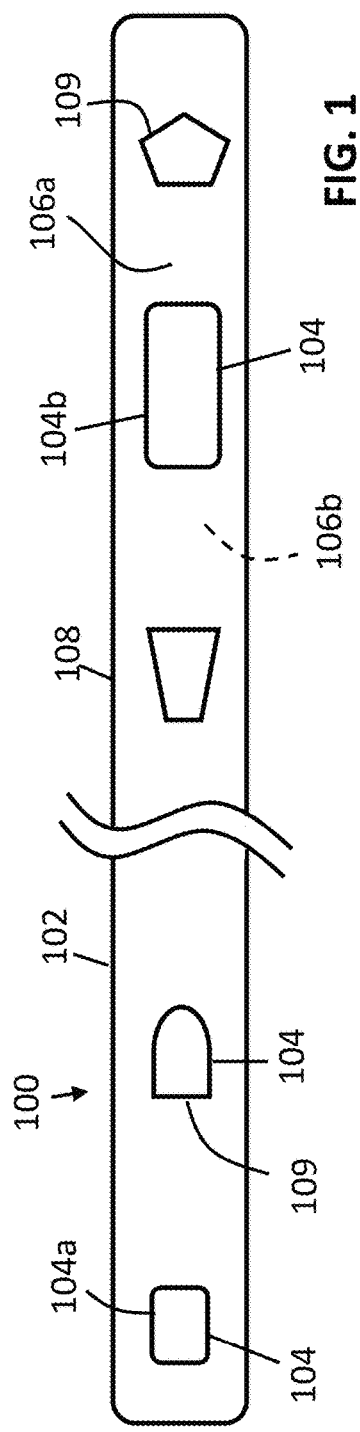
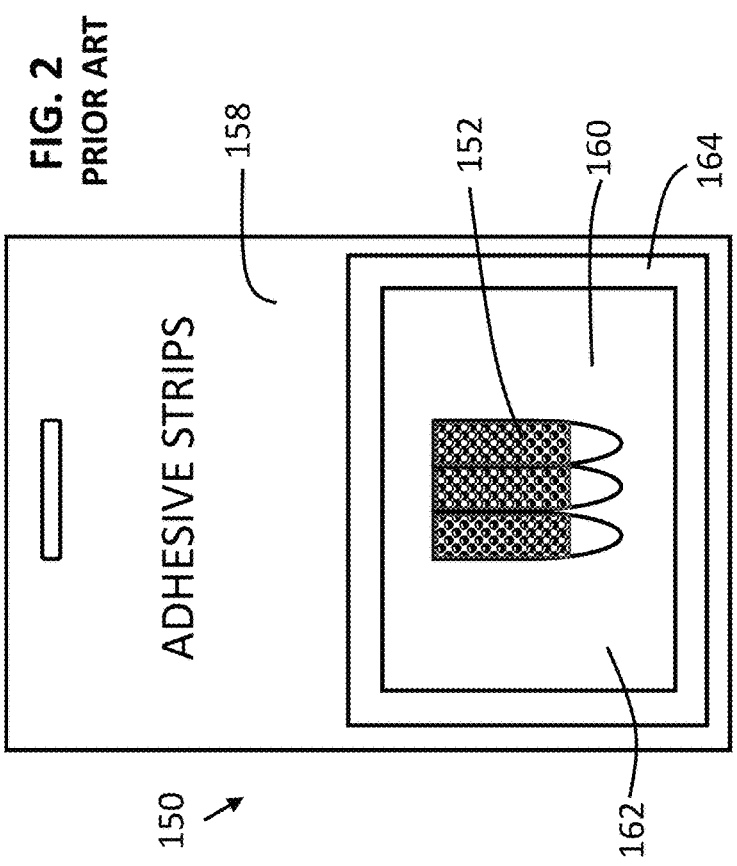

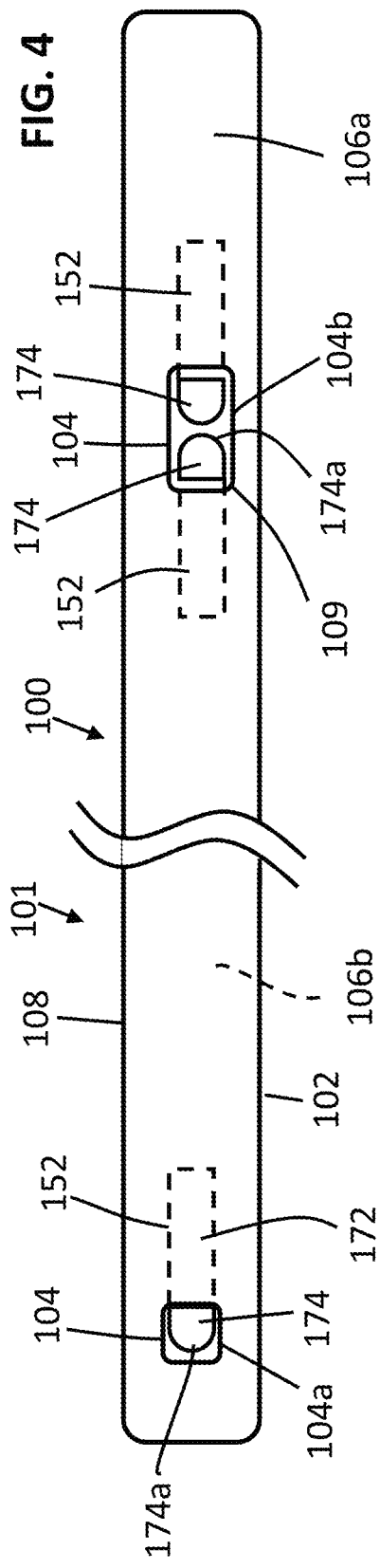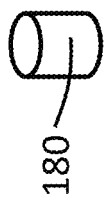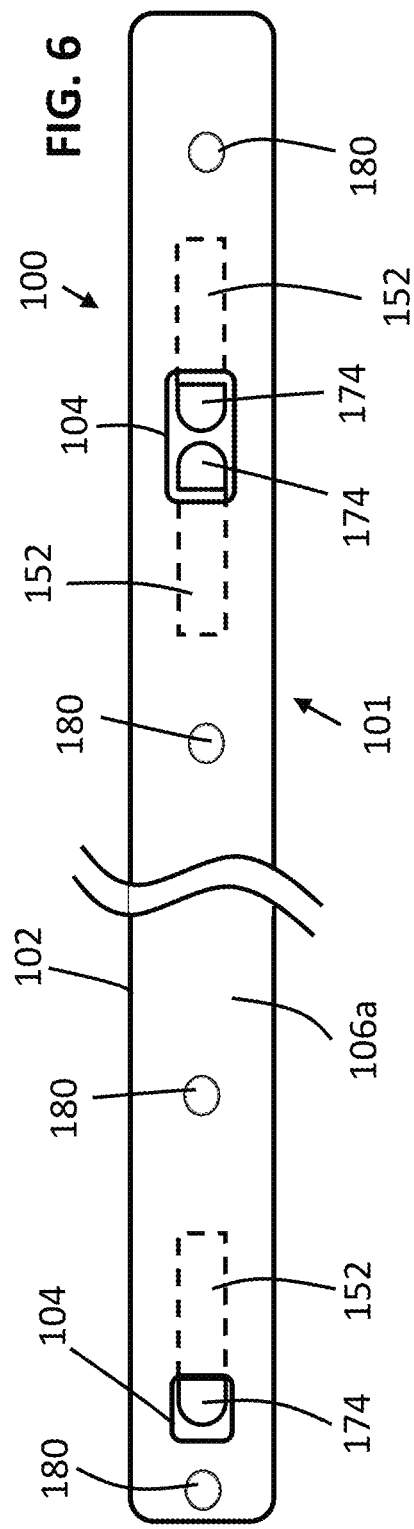

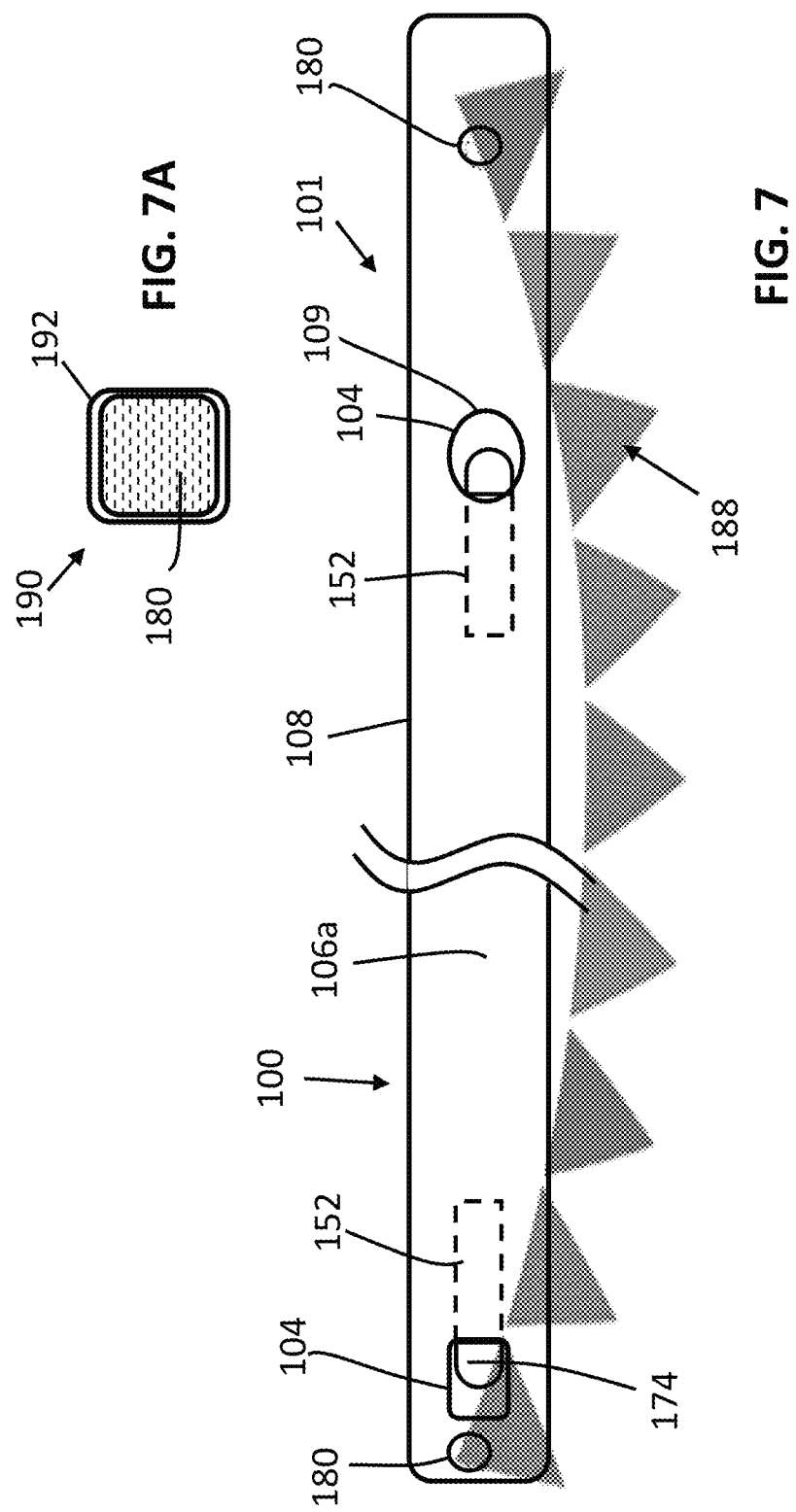

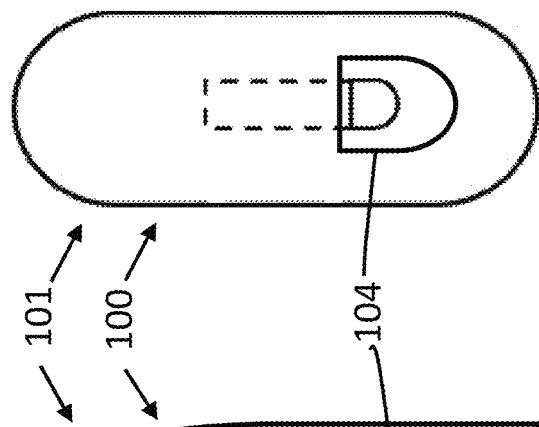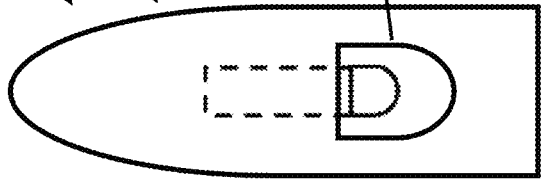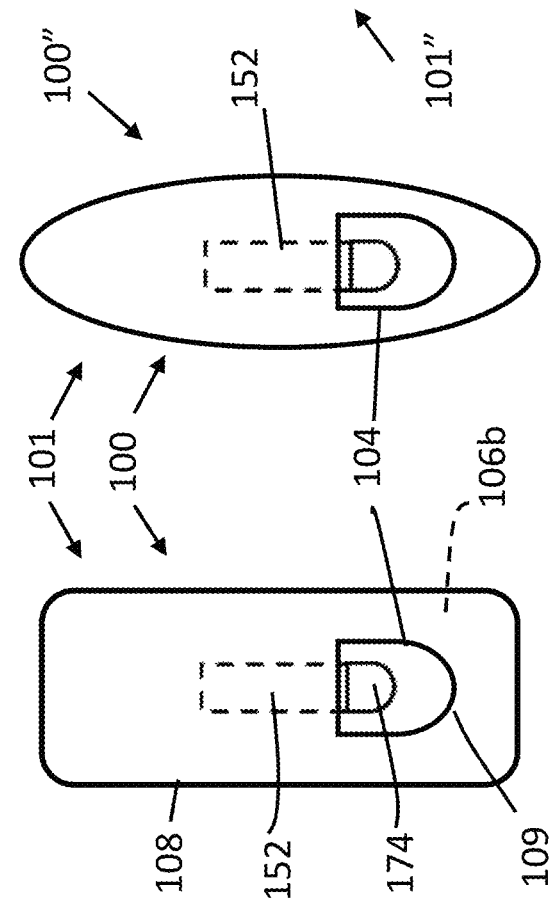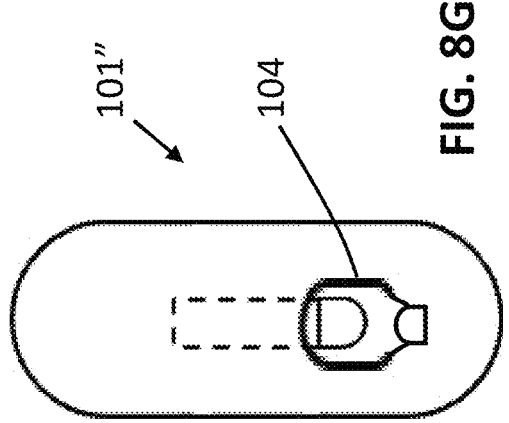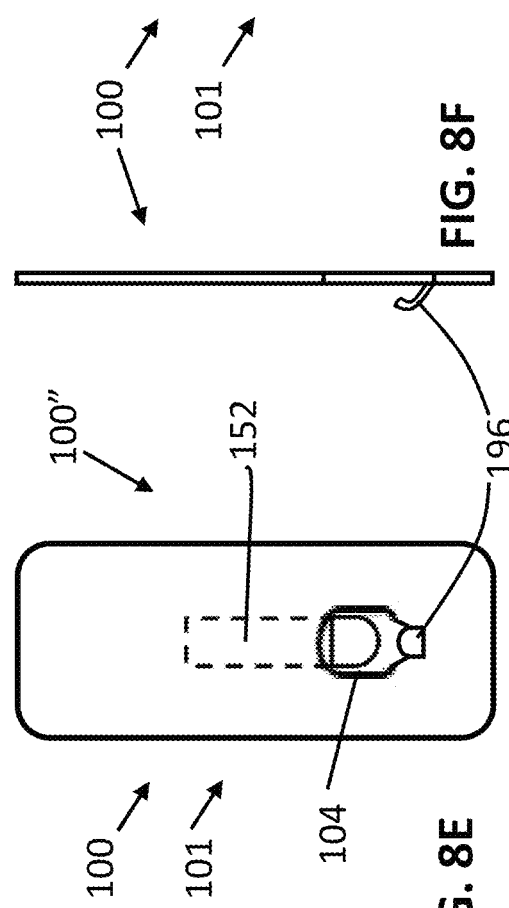

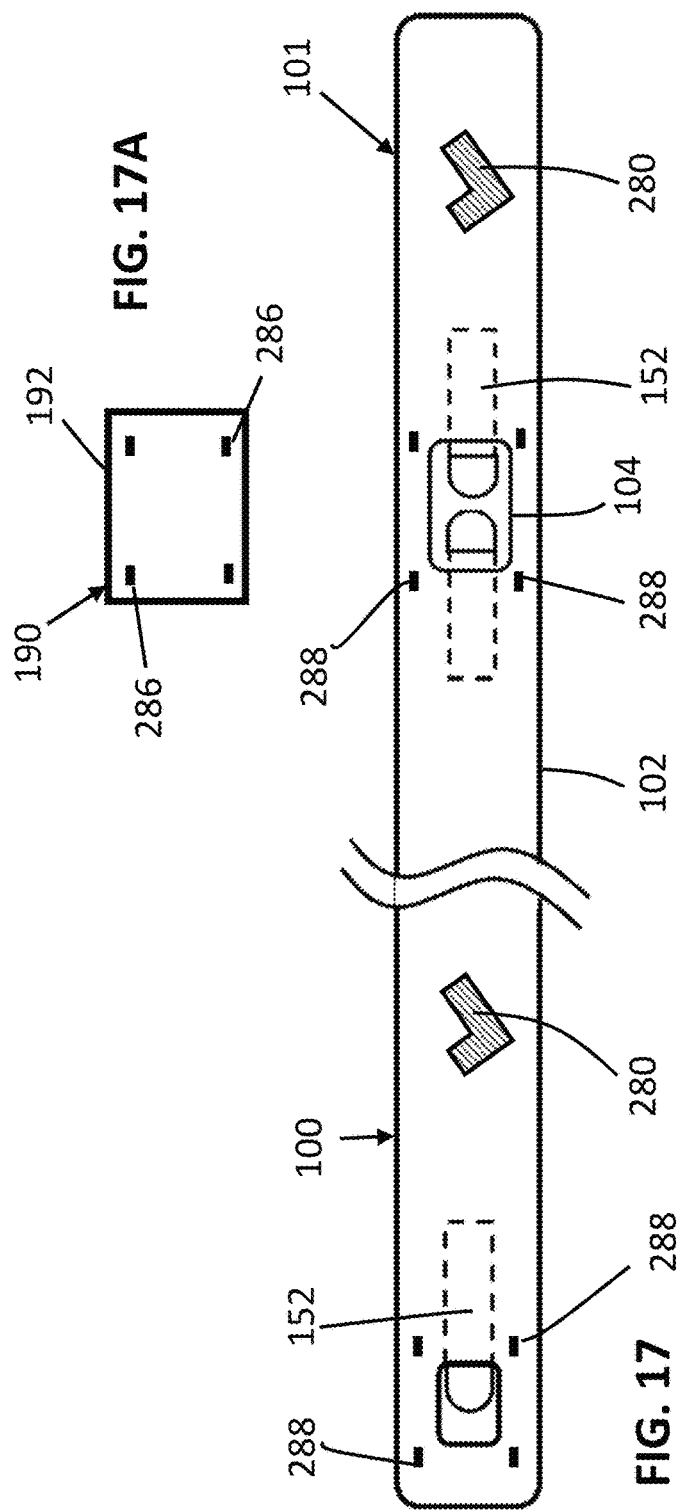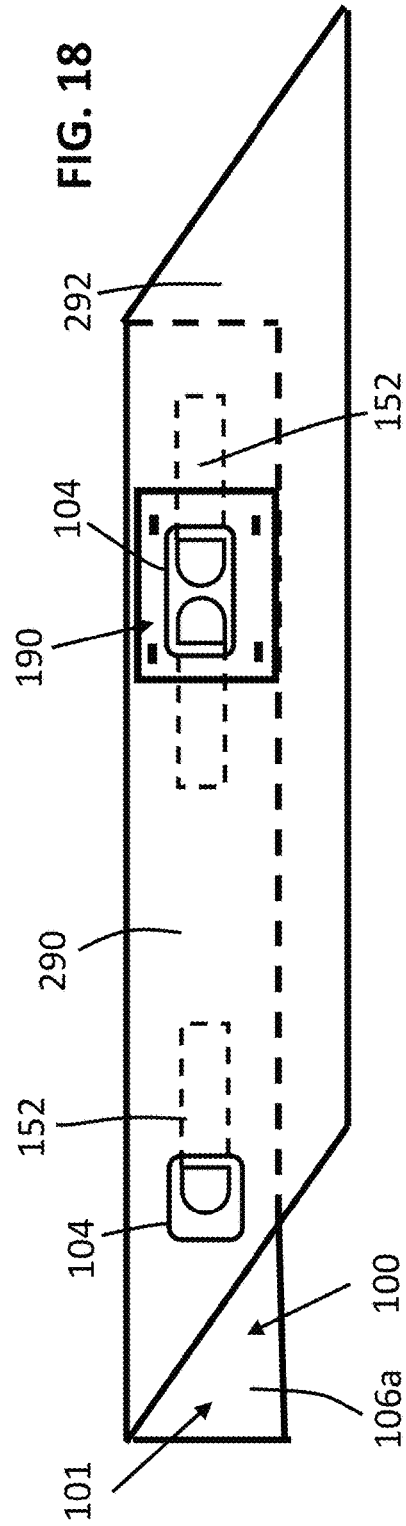

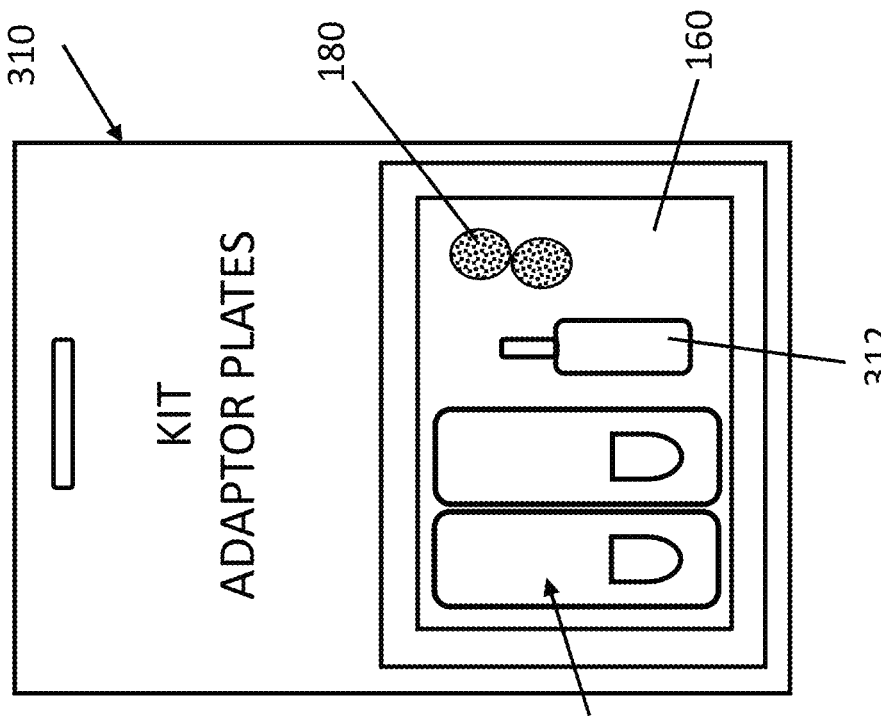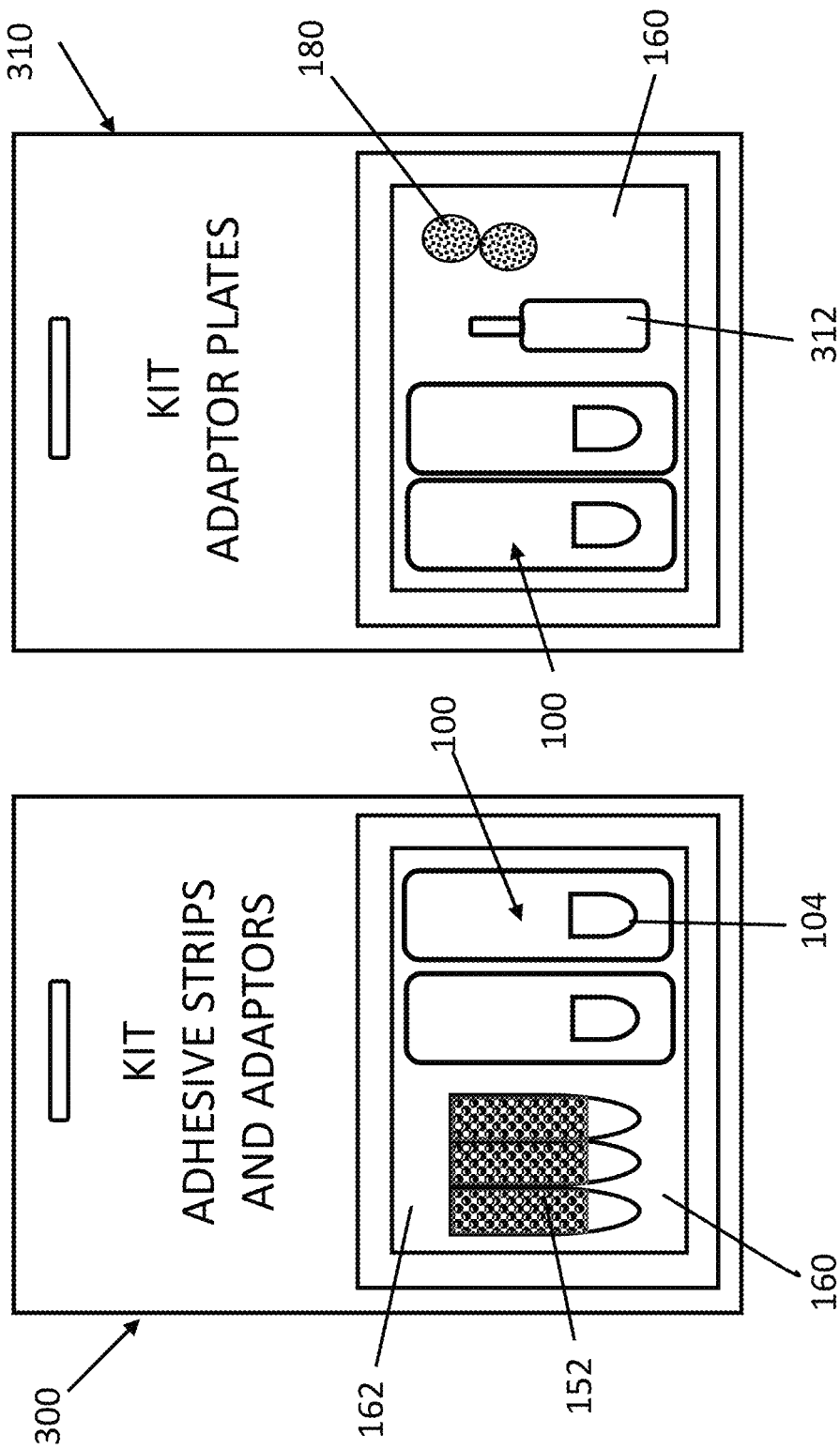

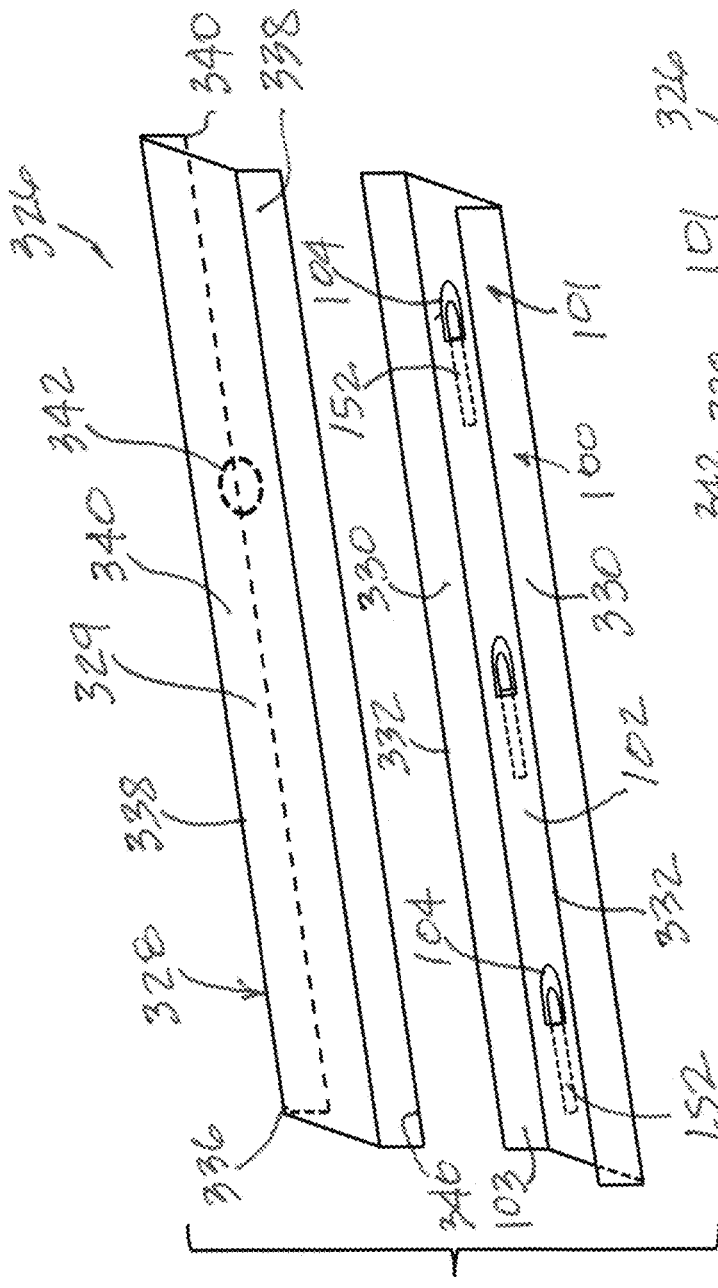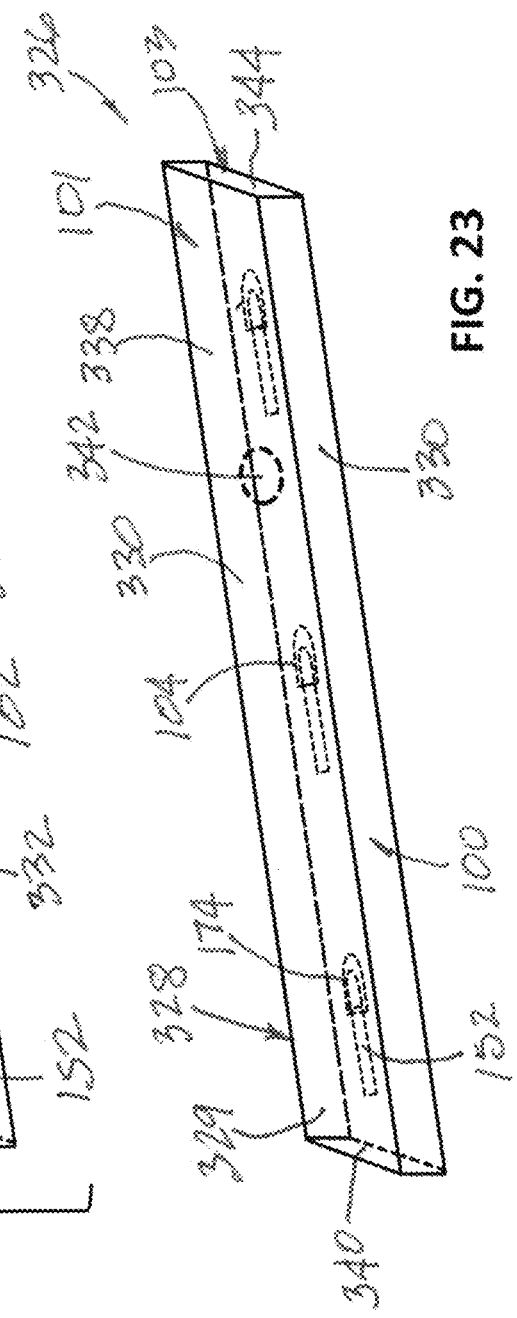
FIG. 22
FIG. 23

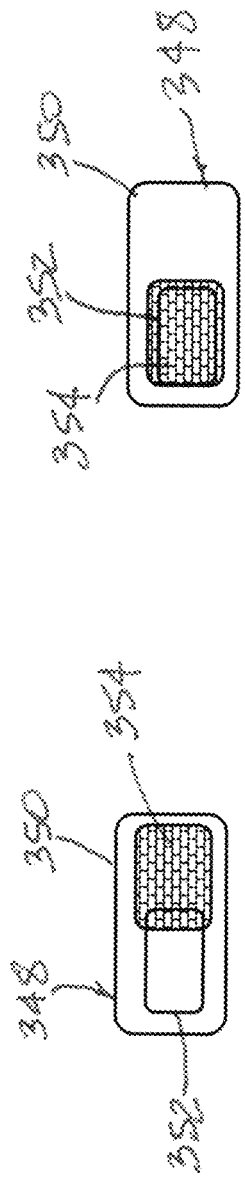
FIG. 24A
FIG. 24b
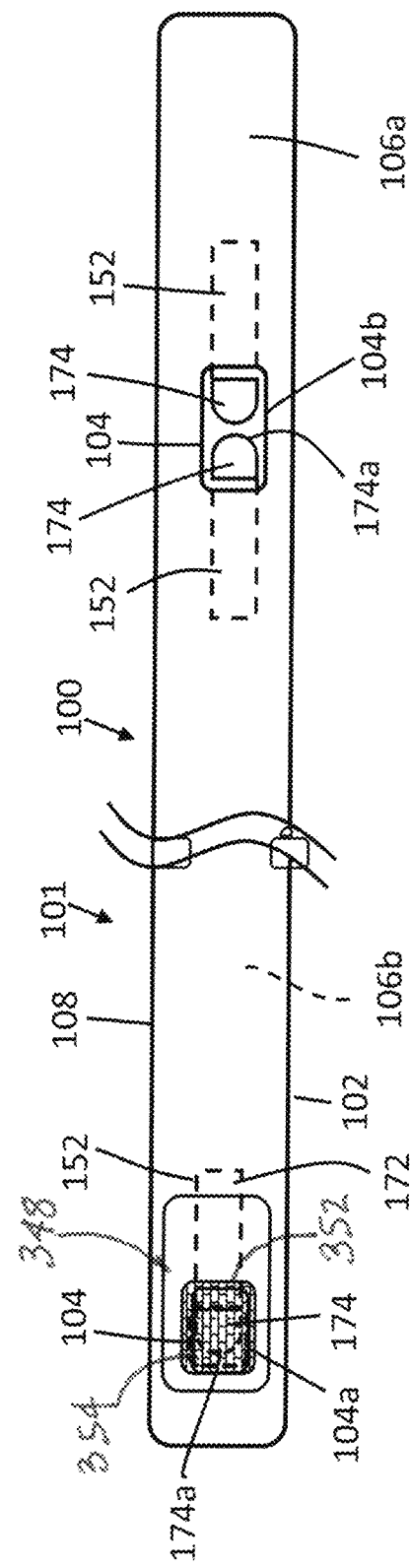
FIG. 25

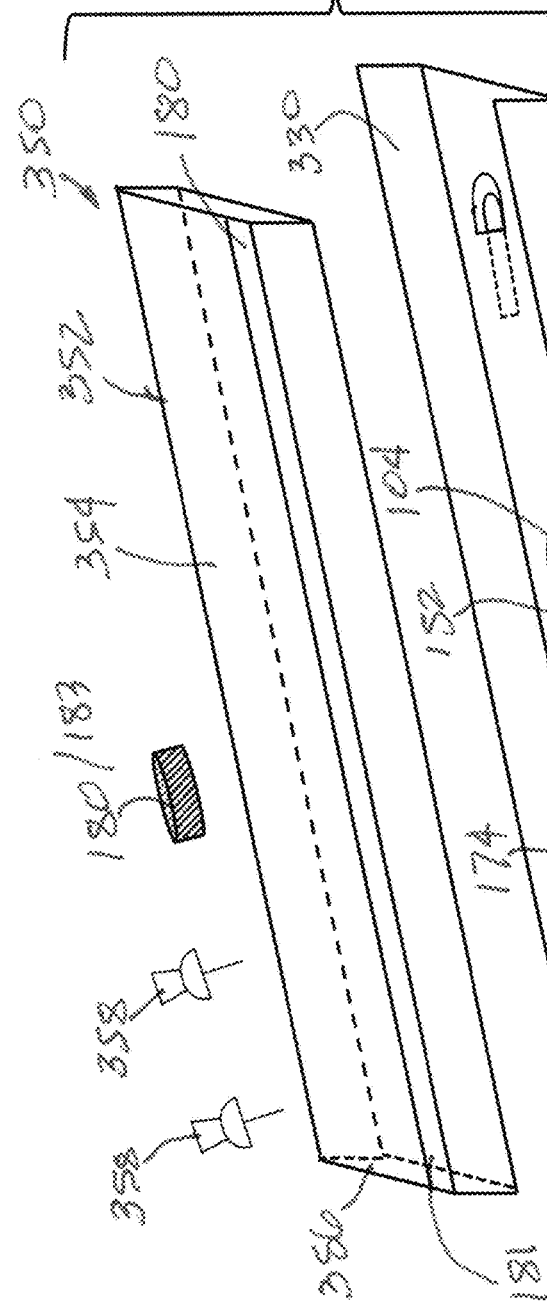

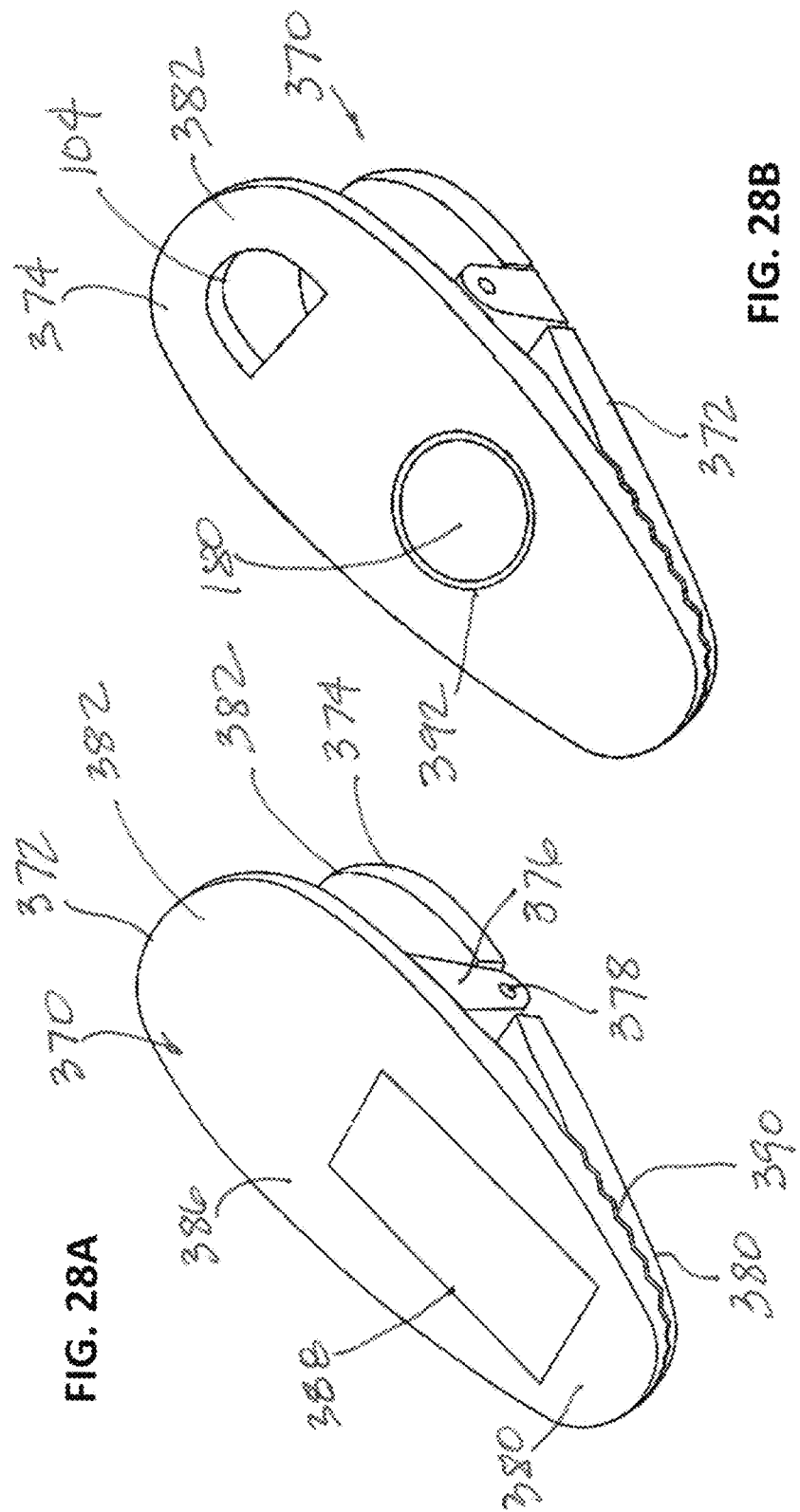

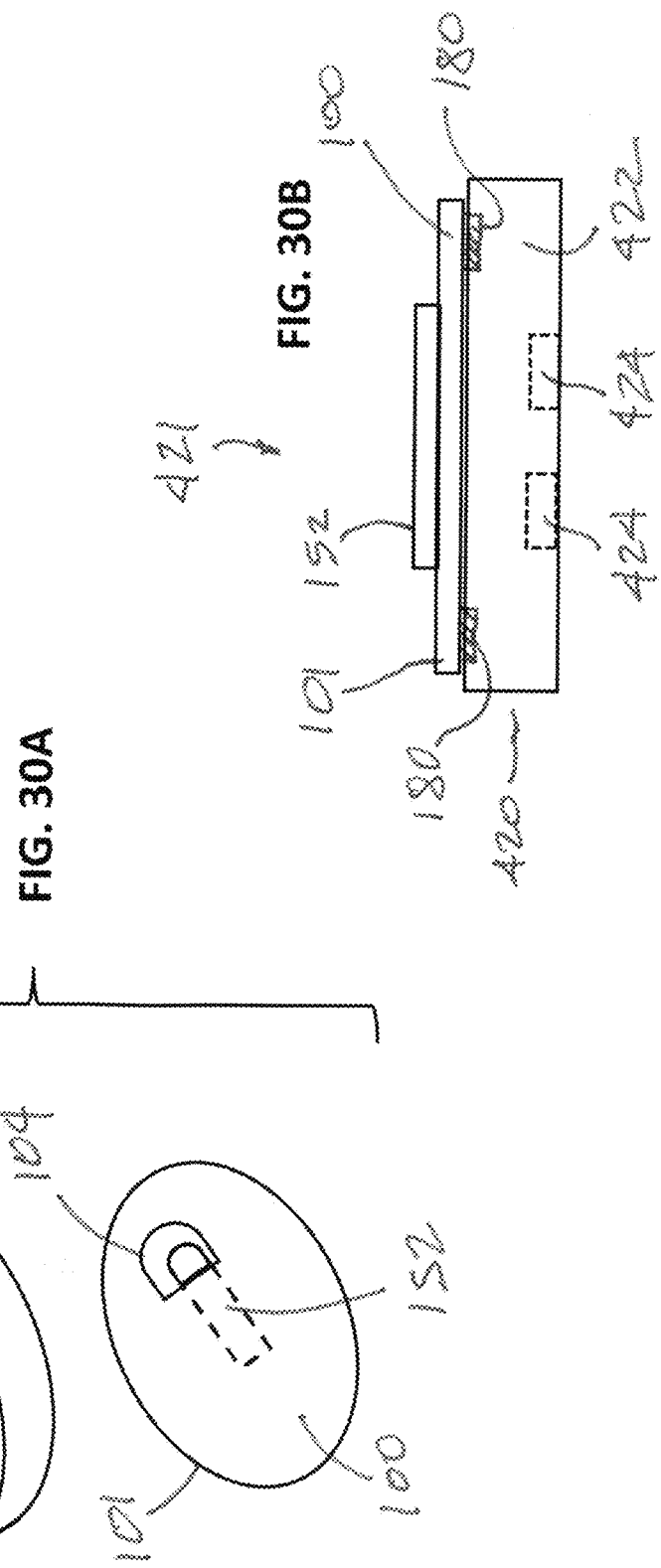

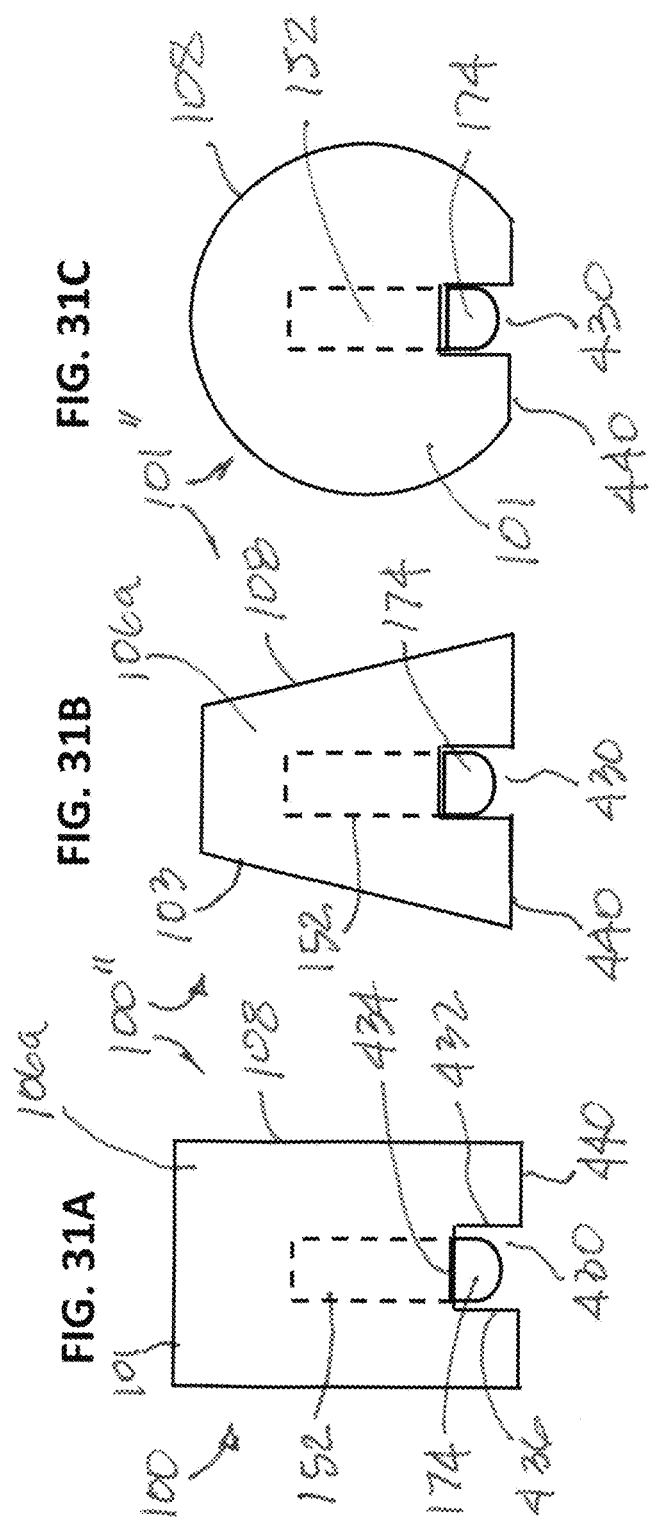

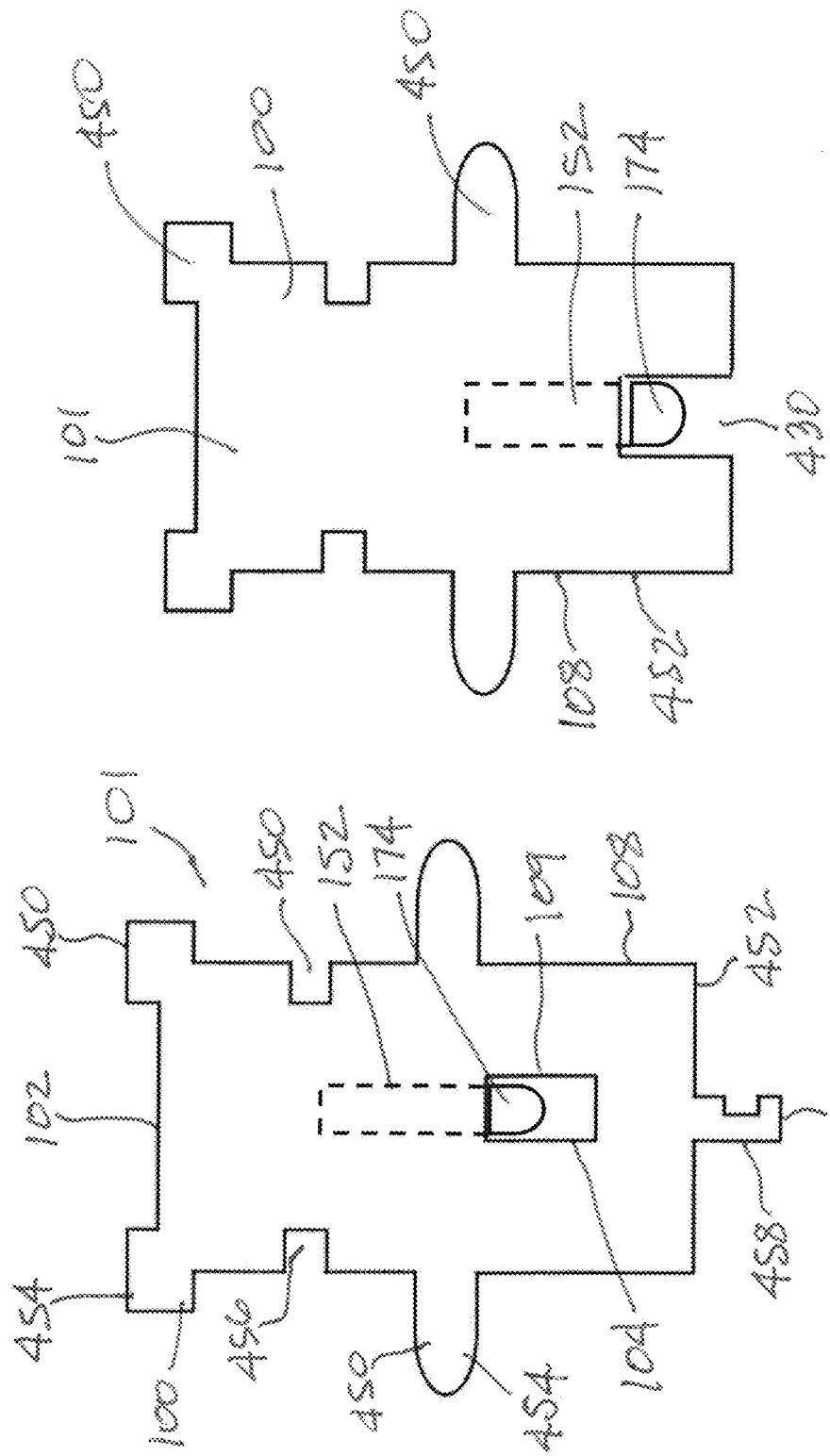

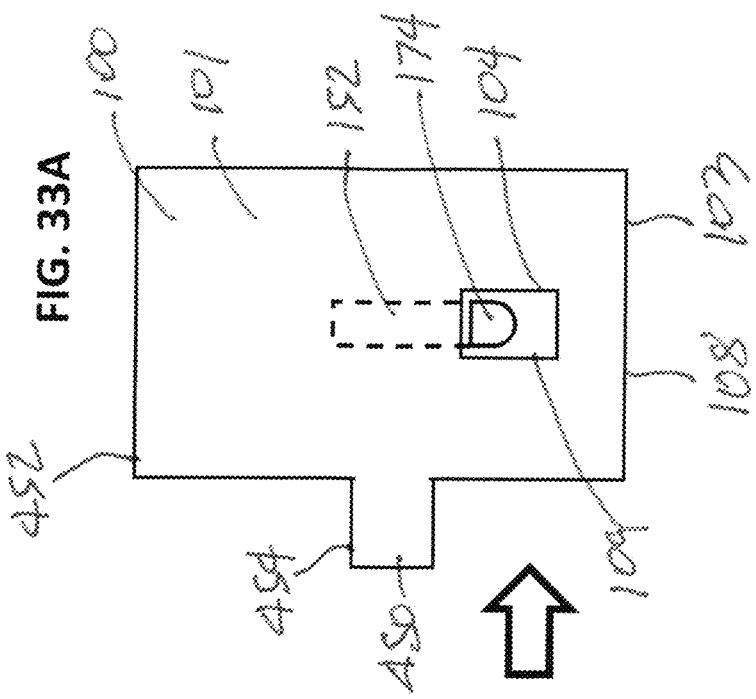
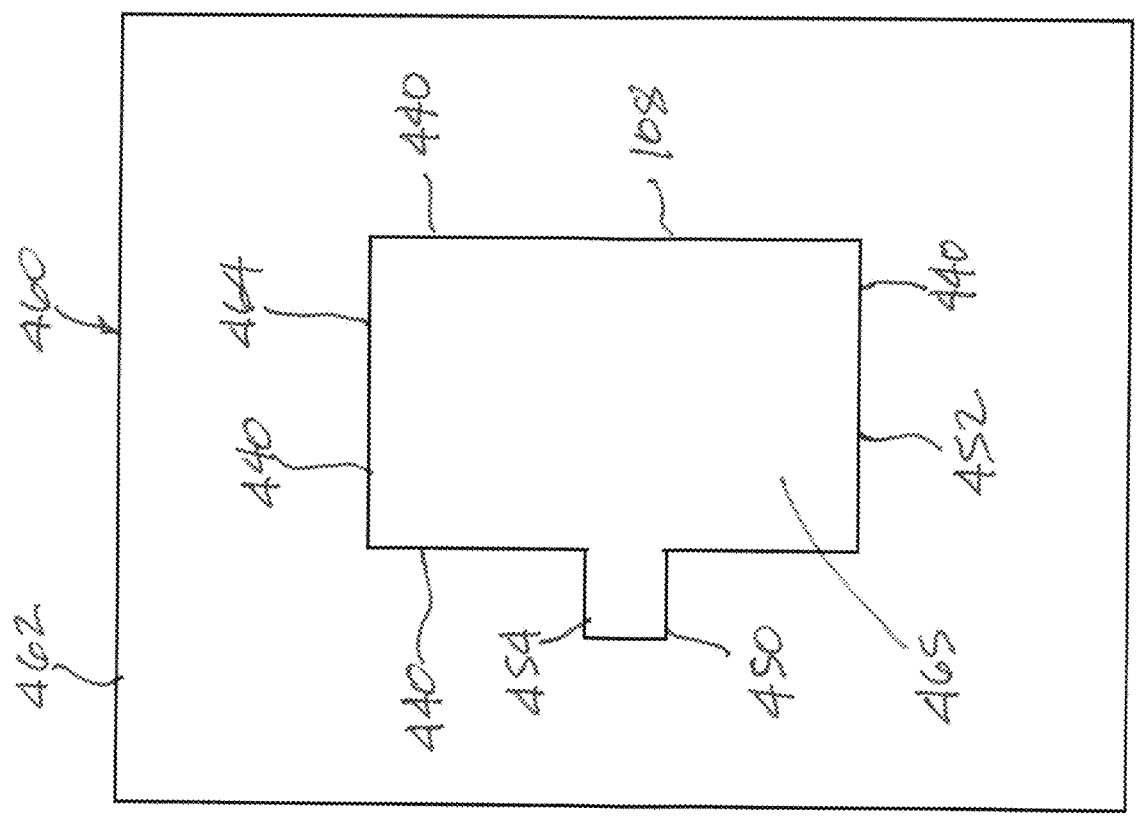

CONVERTIBLE METAL BACKINGS AND RELATED METHODS

CROSS-REFERENCE TO RELATED APPLICATION

This is a continuation of application Ser. No. 18/057,322, filed Nov. 21, 2022, which is a continuation of application Ser. No. 17/651,760, filed Feb. 18, 29022, now U.S. Pat. No. 11,529,010, which is a regular utility application of provisional application Ser. No. 63/295,257, filed Dec. 30, 2021, the contents of each of which are expressly incorporated herein by reference.

FIELD OF ART

The present disclosure is generally related to convertible metal backings and related methods with specific discussions on metal backings attached to wall surfaces with non-destructive strips and related methods.

BACKGROUND

There is a frequent need to hang a picture frame onto a wall. Typically, this involves hammering a nail into a hook to first hang the hook and then hanging the picture frame onto the suspended hook. The process is similar for hanging other items, such as a marker board, a string decoration, and a hat. However, nailing a wall is not always an option, which is why products such as the 3M Command Strips and generic double-sided adhesive strips are very popular. But these strips have limitations.

SUMMARY

A substrate usable with a double-side adhesive strip to suspend the substrate to a wall surface. The substrate can have one or more access holes located within an outer perimeter of the substrate. Each access hole has an inner perimeter inwardly of the outer perimeter that is sized and shaped to allow a tab of the double-sided adhesive strip to be extracted through the inner perimeter, after the substrate is suspended on the wall surface. Various articles can attach to the suspended substrate, such as through magnetic attachment, a hook, or a shelf.

Broadly speaking, aspects of the present invention include a metallic substrate comprising a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; and wherein the maximum width and the maximum length of the inner perimeter is sufficiently large for retrieving a tab of a double-sided adhesive strip adhered to the backside surface of the substrate.

Aspects of the invention further include a substrate comprising a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; a hook integrally connected to the body of the substrate or a shelf integrally connected to the body of the substrate; and wherein the maximum width and the maximum length of the inner perimeter is sufficiently large for retrieving a tab of a double-sided adhesive strip adhered to the backside surface of the substrate.

A still yet further aspect of the invention includes a product package comprising a housing having a cavity, a plurality of double-sided adhesive strips located inside the cavity; and a plurality of substrates located inside the cavity; wherein each substrate comprises: a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; and wherein the maximum width and the maximum length of the inner perimeter is sufficiently large for retrieving a tab of a double-sided adhesive strip adhered to the backside surface of the substrate.

The present invention is further directed to methods of making and using substrates, mount ready substrates and related components.

Aspects of the invention further include a substrate non-destructively attachable on a wall surface, said substrate comprising: a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; and wherein the maximum width and the maximum length of the inner perimeter is sufficiently large for retrieving a tab with an end edge of a double-sided adhesive strip adhered to the backside surface of the substrate.

The substrate of the present invention can comprise a body with an outer perimeter, an exterior side or exposed side, and a backside or covered side. The body can further include at least one access hole with an inner perimeter located inwardly of the outer perimeter or at least one cutout formed at one of the edges of the outer perimeter. Cutouts along an edge to accommodate a tab of a double sided adhesive strip are discussed elsewhere herein. In a particular example, no projection, tab, or rod is included with the body such that no projection, tab, or rod extends or protrudes rearward from the body across or beyond a plane defined by the backside or covered side of the body. Thus, the backside or covered side can be placed flat or flushed to a wall surface without having a projection, tab, or rod interfering with the placement, and without the projection, tab, or rod penetrating into the wall surface. Other substrates described elsewhere herein can be similarly structured, without the noted projection, tab, or rod.

A substrate non-destructively attachable on a wall surface, said substrate comprising: a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length, or a cutout formed along an edge of the outer perimeter to define a recessed space having a maximum width and a maximum length; wherein the maximum width and the maximum length of the inner perimeter or the recessed space are sufficiently large for retrieving a tab with an end edge of a double-sided adhesive strip adhered to the backside surface of the substrate; wherein in a mounted position on a wall surface, no part of the body extends rearward of the backside surface beyond a thickness of a double-side adhesive strip.

A double-sided adhesive strip can adhere to the backside surface of the body, said double-sided adhesive strip can have a tab and said tab can be exposed at the inner perimeter of the access hole.

An integrated hook can be formed on the body. The integrated hook can have a bend adjacent a slit.

The substrate can be made from a metal material. The metal material can be sheet metal. Preferably, the metal material can be magnetic stainless steel materials such as magnetizable stainless steel (SS), which can include SS 409, SS 430, and SS 439, which are known as ferritic stainless steel, and SS 410, SS 420, and SS 440, which hare known as martensitic SS. In some examples, the substrate can be made from a non-metallic material, such as from a plastic material, as further discussed below.

The body of the substrate can have a length along a horizontal axis and a height along a vertical axis and wherein the length can be 2×, 3×, 4×, 5×, or greater than the height, such as 10× the height or greater.

The access hole can be a first access hole and the substrate can further comprise a second access hole spaced from the first access hole. The first and second access holes can be a single-tab access opening-type, a double-tab access opening-type, a large access opening-type, or combinations thereof.

The substrate can have a second double-sided adhesive strip adhered to the backside surface of the body having a second tab exposed at the inner perimeter. In some examples, when a cutout is used, the tab can be exposed at the cutout. Thus, the tab can be recessed from the outer perimeter at the cutout, without incorporating an access hole or opening with an inner perimeter located inwardly of the outer perimeter.

A magnet element can be secured to the backside surface of the substrate. For example, magnet element can be bonded, such as with glue or adhesive, to the backside surface of the substrate.

A magnet element can magnetically attach to the exposed surface of the metallic substrate.

An article with magnetizable metal material may magnetically attach to the substrate having the magnet element or the article with a magnet element can then magnetically attach to the metal substrate.

Alternatively or in addition to using a magnet element, VELCO, such as hook and loop fasteners, may be used to attach an article to a substrate. For example, the article may have a hook fastener can attach to the substrate with the mating loop fastener.

In some instances, such as when an article is attached to a flanged substrate, one or more set screws may be used to secure to the sidewall or flange of the flanged substrate to secure the article to the substrate.

The substrate can have a surface area that is only about 1.5 times to about 8 times the surface area of the strip used with the substrate. A substrate with the noted surface area ratio can be called an individual or single utility substrate, or an individual or single utility mount ready substrate has a double-sided strip included therewith.

A substrate can have a body with edges and sidewalls or flanges extending from the edges to define a receiving space. A substrate with a receiving space formed by sidewalls or flanges may be referred to as a flanged substrate. A flanged substrate can have an access opening or can have a cutout at one of the edges.

In some examples, an article with a mounting bracket having a corresponding shape of the flanged substrate can project into or can couple with the flanged substrate and be held by the substrate. The flanged substrate can have an access hole or a cutout for use with a strip having a tab. In some examples, an article with the mounting bracket can have a size and shape to couple with flanged substrate. In another example, the article itself can fit between the sidewalls or flanges of the flanged substrate, without any mounting bracket. The article that couples to the flanged substrate can be drilled, nailed, or altered by adding permanent adhesive or bonding material, such as to mount another product or article, like string lights or wall décor.

The article that couples to the flanged substrate can be a push pin panel or board that receives one or more push pins or that is usable with one or more push pins.

The article that that couples to the flanged substrate, such as having a mounting bracket that couples to the flanged substrate or itself fits into the flange substrate, can have a magnetizable surface that magnets can then attach. A flanged substrate can have a three-dimensional structure. The three-dimensional structure can include a generally planar portion and one or more sidewalls extending outwardly away from the generally planar portion.

In some examples, the substrate can include one or more pairing features. A pairing feature can be a projection, a channel, or a projection with a channel. The pairing feature can be used with a mounting flange having a similar or corresponding pairing feature to ensure orientation and fit between the two. For example, an article such as a wall decoration may include a mounting bracket with a pairing feature that matches the paring feature of the substrate to ensure proper orientation of the article when mounting to the substrate and to ensure that only the article with the proper mounting bracket can couple to the substrate with the pairing feature.

An article or object, such as a keychain or a hat, can attach to the magnet element or magnetically clamped by the magnet element to the substrate.

In an example, the body of the substrate can be bent, such as being malleable or flexible, to bend around a corner or to substantially conform to an uneven surface. For example, a rubber mat may be used as a substrate and can be bent around a corner and/or conform to an uneven surface. The rubber mat can have one or more access holes for accessing a tab of a strip from a backside or rear surface of the rubber mat. Alternatively, the rubber mat can have a cutout so that a tab of a strip can be accessed from a backside or rear surface of the rubber mat without an internally located inside perimeter.

Thin metal sheets, such as a rolled metal sheet, similar to a rolled tape measure, can be used as a substrate that is bendable around a corner. The rolled metal sheet may have a plurality of spaced apparat access holes, a plurality of cutouts along an edge of the substrate, or combinations thereof.

In an example, the body of the substrate has bent edges, such as sidewalls or flanges, to define a receiving space to prevent movement of an article or item mounted to the substrate.

In an example, the body of the substrate has unique geometric features around the outer perimeter, such as a unique pairing feature, to act as a key mechanism or a pairing system. The substrate can have one or more unique pairing features. For example, the pairing features can include a projection, a recess or channel, or a projection with a recess or channel.

In an example, a 3-dimensional mounting fixture is attached to the exposed surface of a mount ready substrate.

The substrate can have a plurality of access holes and a plurality of double-sided adhesive strips adhered thereto, and wherein a dry erase magnetic sheet is magnetically attached to the exposed surface of the substrate.

A second substrate can have a plurality of access holes and a plurality of double-sided adhesive strips adhered thereto located adjacent a first substrate having a plurality of access holes and a plurality of double-sided adhesive strips adhered thereto.

A holding space can be provided between a perimeter of the dry erase magnetic sheet and the outer perimeter of the substrate, and wherein at least one of a dry erase marker and a dry eraser can magnetically attach to the holding space.

One or more utensils can magnetically attach to the substrate. The utensils can be cooking utensils.

A magnet element can attach to a utensil and the utensil with the magnet element magnetically attached to the substrate.

A magnetic mounting rack comprising a body comprising a magnet element attached to the body of the magnetic mounting rack can magnetically attach to the substrate. The magnetic mounting rack can comprise a front rack surface and wherein a utensil is magnetically attached to the front rack surface.

A cover plate can attach to the substrate and over the inner perimeter of the access hole.

The body of the substrate can coil into a roll. The rolled substrate can be provided with spaced apart access holes, called a substrate tape. For example, the spaced apart access holes can be spaced about 6 inches to about 18 inches, inclusive, between two adjacent access holes. In an example, the rolled substrate, or substrate tape, with spaced apart access holes can be provided in a product package with a dispensing mechanism that allows the rolled substrate to be extended from within the product package and used as needed. For example, if a user needs three feet of substrate tape, the user can pull and extend the rolled substrate from the product package to the desired length and then using a cutter, such as a scissor, a cutter, a grinder, etc., to cut the desired length from the rolled substrate. The user can then add double-sided adhesive strips to the substrate tape to form a mount-ready substrate tape.

A further aspect of the invention includes a rolled substrate having a series of access holes or cutouts formed along an edge of the outer perimeter of the rolled substrate. The access holes or cutouts can be provided in a random or a repeatable pattern, wherein the maximum width and the maximum length of the inner perimeter access hole or the cutout are sufficiently large for retrieving a tab with an end edge of a double-sided adhesive strip adhered to the backside surface of the substrate. The rolled substrate having a series of access holes or cutouts formed along an edge of the outer perimeter of the rolled substrate can be provided in a dispenser or dispensing housing. The dispenser can have an opening whereby an end of the rolled substrates can project therethrough to be dispensed out of the housing. For example, a cutter may be used to cut sections off of the rolled substrate, which can be dispensed through the opening on the housing.

Aspects of the invention can further include a product package with a plurality of substrates, said product package comprising: a housing having a cavity; a plurality of double-sided adhesive strips located inside the cavity, each of the double-sided adhesive strips comprising a tab with an end edge; and the plurality of substrates located inside the cavity; wherein each substrate comprises: a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; and wherein the maximum width and the maximum length of the inner perimeter is sufficiently large for retrieving a tab of a double-sided adhesive strip adhered to the backside surface of the substrate.

A plurality of magnet elements can be located inside the cavity of the product package.

A magnetic dry erase whiteboard sheet can be located inside the cavity of the product package.

At least one of a dry erase marker and a dry eraser can be located inside the cavity of the product package.

Glue, adhesive, or tubes with bonding materials can be located inside the cavity of the product package.

A spring loaded clip can include a magnet and the magnet can attach to a mount ready substrate. The spring loaded clip can alternatively or additionally include an access hole on one or both clip arms. For example, a clip arm can have an outer perimeter and an access hole can be provided with the clip arm such that the perimeter of the access hole is located inwardly of the outer perimeter of the clip arm. A double side adhesive strip with a tab at an end may be used with the spring loaded clip, with the strip adhered to the clip and the tab exposed at the opening of the access hole.

The spring loaded clip of the present invention can non-destructively attach on a wall surface, such as a with a double side adhesive strip or magnetic attraction. The spring loaded clip can have two clip arms and wherein a magnet can be secured to one of the two clip arms for magnetically attaching to a metallic surface.

A further aspect of the invention comprises a cover plate attached to a substrate and covering all or most of the substrate. One or more items or articles can then attach to the cover plate. For example, one or more items can be permanently attached to the cover plate. The assembled cover plate to the substrate can comprise an internal cavity between the cover plate and the substrate and wiring or other items can be located in and hidden side the internal cavity.

An aspect of the invention includes a method of using a metallic substrate, the metallic substrate comprising: a body having an outer perimeter defining a shape of the body, an exposed surface and a backside surface opposing the exposed surface; an access hole located within the outer perimeter, said access hole comprising an inner perimeter, inward of the outer perimeter, having a maximum width and a maximum length; and wherein the maximum width and the maximum length of the inner perimeter is sufficiently large for retrieving a tab with an end edge of a double-sided adhesive strip adhered to the backside surface of the substrate, the method comprising: adhering a first side of a double-sided adhesive strip to the backside surface of the body of the substrate; orienting a tab having an end edge of the double-sided adhesive strip to be located at least partially within the inner perimeter of the access hole so that the tab is viewable through the access hole from an exposed surface-side; adhering a second side of the double-sided adhesive strip to a wall surface; and wherein the tab is recessed within the outer perimeter of the body.

The method can further comprise hanging an article to an integrated hook on the body of the substrate. The article can a decorative string, a picture frame, a hat, a necklace, or a keychain.

The method can further comprise placing a dry erase magnetic sheet onto the exposed surface of the body and covering the access hole.

The method can further comprise placing a utensil onto the exposed surface of the body.

The method can further comprise placing a magnetic mounting rack comprising a body comprising a magnet element attached to the body of the magnetic mounting rack onto the exposed surface of the body and covering the access hole.

The method can further comprise adhering a first side of a second double-sided adhesive strip to the backside surface of the body of the substrate and spaced from the first double-sided adhesive strip; and orienting a tab having an end edge of the second double-sided adhesive strip to be located at least partially within an inner perimeter of a second access hole so that the tab of the second double-sided adhesive strip is viewable through the second access hole from the exposed surface-side.

Aspects of the invention further include a method of removing an adhesive strip from a mount ready substrate that has been suspended or mounted to a wall surface. The method of removing can include a step of reaching through an access hole, which has an inner perimeter located inwardly of the substrate outer perimeter, or a cutout along an edge of an outer perimeter, grasping the adhesive tab, pulling the tab in a linear direction along on a plane that is parallel to the substrate inner and outer surfaces, thereby elongating the tab until the double side adhesive strip releases from the surface of the substrate and the wall surface.

In some examples, the method further comprises removing a second adhesive strip, or additional adhesive strip from the substrate. The removal can comprise pulling on a tab of a second double sided adhesive strip through an opening of a second access hole, along a generally parallel surface as the exposed surface of the substrate.

The method can first include removing an article from the mount ready substrate. The method can follow with reaching through an access hole or a cutout along an edge of the substrate and then pulling on the adhesive strip tab in a generally parallel direction as the exterior surface of the substrate.

A still further aspect of the invention is a method of removing a double-sided adhesive strip holding a substrate having a body with an outer perimeter to a wall surface, said method comprising: (1) grabbing a tab of the double-sided adhesive strip to pull the tab through an inner perimeter of an access hole, which is located inwardly of the outer perimeter, from an exposed surface side of the substrate and then stretching the double-sided adhesive strip generally parallel to the exposed surface of the substrate to pull a body section of the double-sided adhesive strip from a backside surface of the substrate through the inner perimeter, or (2) grabbing a tab of the double-sided adhesive strip to pull the tab through a cutout formed at an edge of the outer perimeter from an exposed surface side of the substrate and then stretching the double-sided adhesive strip generally parallel to the exposed surface of the substrate to pull a body section of the double-sided adhesive strip from a backside surface of the substrate across the cutout.

Broadly speaking, the substrate and mount ready substrate of the present invention can be made from any number of materials, including metallic and non-metallic. An article with a magnet can then attach to the substrate, if the substrate is made from a metal metallic. Alternatively, the substrate can be magnetized, such as by providing the substrate with one or more magnet elements, and then an article with magnetizable metal surface can magnetically attach to the substrate. The substrate can have a body with an outer perimeter and an access hole with an inner perimeter located inwardly of the outer perimeter. Alternatively or in addition therewith, a cutout along an edge of the outer perimeter can be provided. Whether the substrate has an access hole or a cutout, a double sided adhesive strip can be placed on backside or covered side of the body of the substrate so that the tab of the strip is located at the inner perimeter or at the cutout. Of course, the other side of the double-sided adhesive strip is adhered to a wall surface so that the substrate is suspended or attached to the wall surface. When the strip is so aligned, the user can grab or grip the tab at the access hole or at the cutout from the exterior or exposed side of the body and then pulling on the tab in a generally parallel fashion to the surface of the substrate to stretch the strip so that all of the strip are pulled through the access hole or the cutout to then separate the strip from the substrate and the wall surface, thereby allowing the substrate to be removed from the wall surface without creating a hole in the wall surface to mount the substrate. The body of the substrate should be generally planar so that in a mounted position on a wall surface, no part of the body extends rearward of the backside surface beyond a thickness of a double-side adhesive strip.

By not using a nail or a screw to hang the substrate of the present invention, this allows the substrate to be suspended or secured to the wall surface with a double sided adhesive strip without creating a hole in the wall.

Further, unless the context indicates otherwise, features discussed for one embodiment may be incorporated in other disclosed embodiments unless their incorporation defeats or degrades the manner in which the combination may be used.

Methods of making and of using the substrates, mount ready substrates, kits, and related components are within the scope of the present invention. Further, unless the context indicates otherwise, features discussed for one embodiment may be incorporated in other disclosed embodiments unless their incorporation defeats or degrades the manner in which they can be used.

BRIEF DESCRIPTION OF THE DRAWINGS

These and other features and advantages of the present devices, systems, and methods will become appreciated as the same becomes better understood with reference to the specification, claims and appended drawings wherein:

FIG. 1 is a schematic front view of a substrate of the present invention.

FIG. 2 is prior art product package containing a plurality of double-sided adhesive strips ("strips").

FIGS. 3A and 3B show a prior art double-sided adhesive strip with a peelable cover and with the peelable cover removed, respectively.

FIG. 4 shows a mount ready substrate in which one or more strips are attached to the body of the substrate.

FIG. 5 shows a magnet element useable with the substrate.

FIG. 6 shows a plurality of magnet elements magnetically attached to a mount ready substrate.

FIG. 7 shows a flag string attached to a mount ready substrate.

FIG. 7A shows a cover plate having a magnet element.

FIGS. 8A-8G show different substrate embodiments in accordance with aspects of the invention.

FIG. 17 is a schematic front view of a non-metallic substrate of the present invention having at least one integrated hook.

FIG. 17A shows a cover plate provided in accordance with further aspects of the invention.

FIG. 18 is a schematic front view of a substrate of the present invention having a shelf integrated with the body of the substrate.

FIG. 19 shows a product package having a plurality of strips and substrates located inside the cavity of the product package.

FIG. 20 shows a product package having a plurality of substrates and magnet elements located inside the cavity of the product package.

FIG. 22 is an exploded view of a display frame assembly in accordance with as aspects of the invention.

FIG. 23 is a schematic perspective view of the display frame assembly of FIG. 22 in an assembled state.

FIGS. 24A and 24B a shutter-type cover plate in an open state and a closed state, respectively.

FIG. 25 shows a mount-ready substrate having a shutter-type cover plate located over the opening of one of the access holes to cover the access hole.

FIG. 26 is an exploded view of a display frame assembly in accordance with as further aspects of the invention.

FIG. 27 is a schematic perspective view of the display frame assembly of FIG. 26 in an assembled state.

FIGS. 28A and 28B show a spring-loaded clip in a front perspective view and a rear perspective view, respectively.

FIG. 30A shows an LED button light fixture and a mount ready substrate.

FIG. 30B is a schematic side view of the LED button light fixture of FIG. 30A coupled to or attached to the substrate.

FIGS. 31A-31C show alternative individual or single utility substrates and individual or single utility mount ready substrates in accordance with further aspects of the invention, each with a cutout along an edge.

FIGS. 32A and 32B show mount ready substrates with a contoured outer perimeter, having at least one paring feature along an outer perimeter.

FIG. 33A shows a substrate with a contoured outer perimeter with at least one paring feature and FIG. 33B shows an article with a mounting bracket with a corresponding contour for paring with the substrate of FIG. 33A.

DETAILED DESCRIPTION

Figure 10:
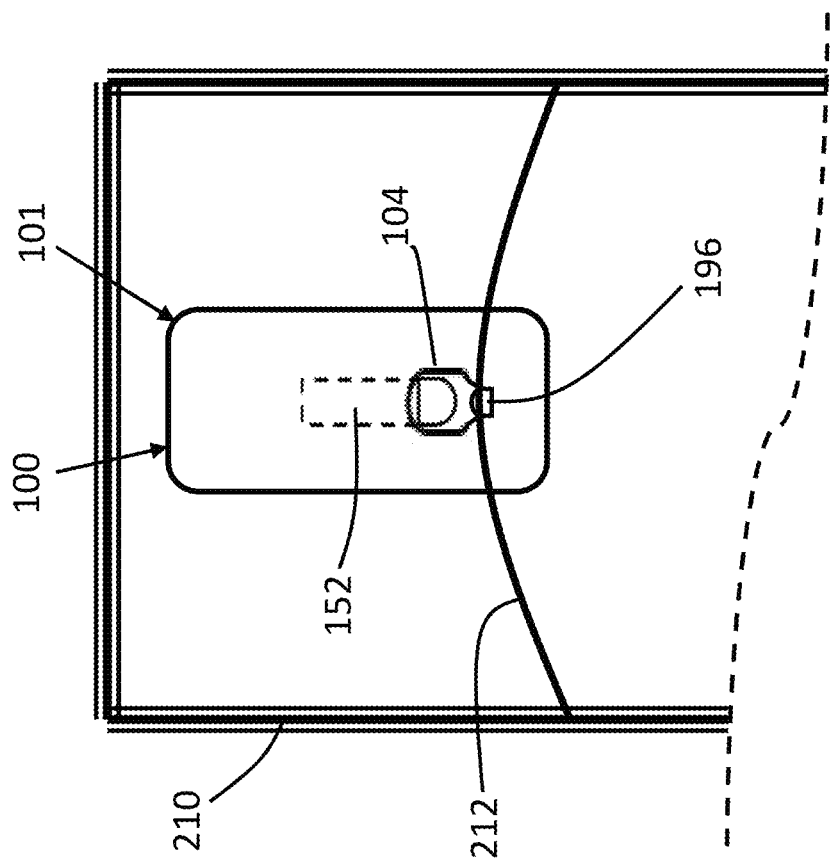
FIG. 10 shows a picture frame attached to a hook of a mount ready substrate.

The detailed description set forth below in connection with the appended drawings is intended as a description of the presently preferred embodiments of convertible metal backings provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

With reference now to FIG. 1, a backing or substrate 100 in accordance with aspects of the present invention is shown. The substrate 100 may be used as a base or anchor from which to attach other products or objects, such as decorative light strings, decorative vines, a plurality of personal items, such as hats, key chains, picture frames, etc. As further discussed below, the substrate of the present invention allows products or objects to be hung on a wall surface without the need to destructively alter the wall surface, such as by nailing, drilling, and/or tapping into the wall surface. In the present embodiment, the backing or substrate 100 is a long metal strip having a length or width along the horizontal axis and a height along a vertical axis, and wherein the length is substantially longer than the height, in the order of 4× or more, such as 10× or more, 20× or more, and preferably 25× or more. However, depending on the applications, the length to height ratio can vary, such as being 1:1 or 1:1.1 and higher increments, such as 1:1.2, 1:1.3, etc. The backing or substrate can be made from a steel material, such as sheet metal, or a magnetic stainless steel, which is understood to mean stainless steel that is magnetizable. For example, ferritic stainless steel (SS) and martensitic stainless steel can be used as the substrate of the present invention. Exemplary magnetic stainless steel materials include SS 409, SS 430, and SS 439, which are known as ferritic stainless steel, and SS 410, SS 420, and SS 440, which hare known as martensitic SS. In some examples, the substrate can be made from a non-metallic material, such as from a plastic material, as further discussed below.

The backing or substrate 100 can have a body 102 having a length, a height, and a thickness or gauge. Different thicknesses may be used, including a thickness that is sufficiently thin to enable coiling the substrate 100, when made from a metal material, into a roll, similar to a tape measure. At the higher end of the gauge range, the thickness can be selected to not readily buckle or fold but sufficiently thin so as to be suspended onto a wall with an adequate number of double-sided adhesive strips, similar to the 3M Command strips, as further discussed below.

FIG. 1 shows a plurality of access holes or openings 104 formed through the body 102 of the substrate 100, such as through the thickness of the body, to define a plurality of through holes that extend completely through the thickness of the body. The access holes 104 can be spaced along the length of the body 102. In an example, the holes are spaced about every 4-inches to about 36-inches from one another, with about 4-inches to about 18-inches of spacing between two adjacent access holes being more preferred. The access holes 104 can be equally spaced along the length of the body 102 or not equally spaced, such as randomly spaced along the length. Each access hole 104 can have a dimension or size that is substantially larger than a typical pre-drilled or pre-prepared hole for mounting a nail or a screw for attaching or hanging on a wall. Preferably, each access hole is sized and shaped to allow extraction of a tab of a double-sided adhesive strip when the double-sided adhesive strip is located or positioned behind the plane defined by the front surface of the substrate.

The shape of each access hole 104 can vary, such as being generally square, round, polygonal, and irregular provided the opening size is sufficiently large enable a user to grip and retract a tab of a double-sided adhesive strip used to suspend the substrate so that the strip can be removed, such as following usage or for re-positioning the substrate. The substrate 100 can have an exposed side or exterior side 106a facing the user and a backside or covered side 106b facing away from the user. After a double-sided adhesive strip, such as a 3M Command strip or similar generic double-sided adhesive strip, is placed onto the backside 106b of the substrate, within the outer perimeter 108 of the substrate, and then onto a wall surface, the tab of the adhesive strip can still be accessed through the access hole 104 to enable removal of the strip by pulling on the tab generally parallel to the wall surface to stretch the adhesive strip. Thus, relative to the tab of the adhesive strip, each access hole 104 on the substrate should be generally the same size or sufficiently large compared to the area of the tab to allow gripping, grabbing, and/or pulling of the tab through the inner perimeter 109 of the access hole 104 and out from the backside 106b to the exposed side 106a of the body 102 for removal of the adhesive strip, as further discussed below.

The body 102 of the substrate 100 has an outer perimeter 108, which circumscribes the surface of the substrate and each access opening 104 has an inner perimeter 109, which is located inwards of the outer perimeter 108. In other words, the inner perimeter 109 and the outer perimeter 108 are spaced from one another by a portion or section of the body 102.

FIG. 2 depicts a typical product packaging 150 for a supply of double-sided adhesive strips 152, which typically comes in quantities of 10-strips, 20-strips, 30 strips, and other quantities greater than one. The double-sided adhesive strips 152, or strips for short, are also available in different sizes with correspondingly different holding capacities, such as 1-pound, 3-pounds, 5-pounds, and 16-pounds, for large adhesive strips. The product packaging 150 typically includes a paperboard or backing 158 and a clear blister pack 160 having a cavity 162 for holding the plurality of strips 152. The blister pack 160 further has a flange or a perimeter 164 for securing the blister pack 160 to the paperboard 158, such as by bonding, stabling, or adhesive.

FIG. 3A shows a typical strip 152 with two peelable or protective covers 166 (only one shown) placed over the adhesive portion of the strip to protect the adhesive until use. FIG. 3B shows the strip 152 of FIG. 3A with the peelable cover 166 removed to expose the adhesive 170 on the first side of the strip body 172. The body further has a tab 174 at and end thereof having an end edge 174a, which is typically not coated with any adhesive and is configured to be gripped or grabbed to stretch the body 172 to deactivate the adhesive 170. If the first side of the strip 152 is applied to the substrate 100, then the second side of the strip, after removal of the second peelable cover from the second side, can be applied to the wall surface to suspend the substrate onto the wall, as further discussed below. It is understood that when the substrate 100 is suspended on a wall surface with the one or more strips 152, sufficient pressure is applied to the substrate over the location or locations of the one or more strips to press the one or more strips against the wall to set the adhesive.

With reference again to FIG. 1, the substrate 100 can have a length configured for spanning some, a majority, or the entire length or width of a wall. For example, in a dormitory, the substrate 100 can be 6-feet long or about 16-feet long to span the length of the dorm room. Optionally, more than one substrate 100 may be used in series or in a pattern to span the length of the room. When using a long substrate, the length of the substrate 100 can be stored or stowed by rolling, like tape measure, to form a rolled substrate. However, if the length is short, such 1-inch to about 18-inches, the length can be kept straight or flat.

The rolled substrate can be provided with spaced apart access holes, called a substrate tape. For example, the rolled substrate can be provided in a rolled configuration that is 4 to 40 feet long inside a product package and offered as a commercial product. A plurality of double-sided adhesive strips 152, such as 10 or more strips, like 25 or more strips, may be provided with the product package, either in the same product packaging or in a separate product packaging. Spaced apart access holes 104 can be provided with the rolled substrate. The spaced apart access holes can be about 6 inches to about 18 inches, inclusive, apart or between two adjacent access holes, also referred to as access hole pitch. In an example, the rolled substrate, or substrate tape, with spaced apart access holes or access hole pitch can be provided in a product package with a dispensing mechanism that allows the rolled substrate to be extended from within the product package and used as needed. For example, if a user needs three feet of substrate tape from a six feet roll, the user can pull and extend the rolled substrate from the product package to the desired length and then using a cutter, such as a scissor, a cutter, a grinder, etc., to cut the desired length from the rolled substrate. The user can then add double-sided adhesive strips to the substrate tape to form a mount-ready substrate tape.

Different access holes 104 are shown. In some examples, the same access hole type, such as the same shaped access hole, for the plurality of access holes is incorporated with the substrate. While the access holes 104 can have different shapes, it is preferred that each access hole 104 has at least one straight edge arranged or aligned on the same side from where the tab 174 on the double-sided adhesive strip 152 projects. For example, when applying a strip on the backside 106b of the substrate 100, the adhesive body of the strip should orient away from the access hole 104 and the tab 174 should orient at the access hole with the at least one straight edge of the access hole approximately directly over the tab, as further discussed below. The perimeter of each access hole 104, or at least the one straight edge, should be smooth and substantially free of burrs and/or sharp edges to minimize cutting or tearing into the strip 152 during removal of the strip through the access hole 104.

While the access holes 104 for a length of substrate 100 are typically uniform and typically evenly spaced, the substrate 100 of FIG. 1 has different shapes and sizes. In an example, an access opening 104 can be of the single-tab access opening type 104a, which is understood to mean an opening having a dimension that is sized to allow a single tab 174 from a single strip 152 (FIG. 3B) to be gripped, grabbed, and/or pulled through the perimeter of the access opening 104a to remove the strip 152. In another example, the access opening 104 can be of the double-tab access opening-type 104b, which is understood to mean an opening having a dimension that is sized to allow two tabs 174 from two strips 152 to be gripped, grabbed, and/or pulled through the perimeter of the same access opening 104b to remove the strip 152. For example, two strips 152 can be placed end-to-end onto the substrate with the tabs oriented against one another so that both tabs be accessible through the double-tab access opening-type 104b, as further discussed below. Less preferred, two tabs from two different strips can overlie one another so that they can both be accessed from the same single-tab access opening 104a.

FIG. 4 shows a substrate 100 in accordance with aspects of the invention having a body 102 with a plurality of access holes 104, similar to that of FIG. 1. While the current substrate 100 is shown with two different access opening types for discussion purposes, embodiments of the substrate 100 can be practiced with just one type or the other type, and of the same opening shape or different opening shapes. Also shown in FIG. 4 are strips 152 applied to the backside 106b of the substrate 100. For example, a strip 152 is shown placed adjacent the single-tab access opening 104a and the tab 174 of the strip is exposed through the access opening 104a while the adhesive part of the strip is located behind the solid part of the substrate (shown in dashed-lines or hidden lines). If the exterior side or exposed side 106a defines a plane, the strip 152, including the body 172 and the tab 174, is located behind the plane. Thus, the single-tab access opening 104a is sufficiently sized relative to the tab to enable gripping, grabbing, and/or pulling the tab from a location behind the exposed side 106a, such as by accessing the tab through the access opening from the exposed side 106a. In an example, the access opening 104a has an opening area that is at least 50% larger than the area of the tab. In other examples, the access opening is approximately the same size as the tab or larger than the tab to enable accessing the tab from the exposed side of the substrate.

In general, an access hole 104 on the substrate approximately the same size or sufficiently large compared to the tab 174 of a double-sided adhesive strip so that the tab 174 can be accessed through the opening of the access hole 104 and removed from a position behind the substrate and out through the opening of the access hole. This allows all of the strip 152 to be located behind the substrate 100 and not distort the plane defined by the exposed or exterior surface 106a of the substrate. This ensures that the surface finish of the substrate 100 is generally flat or flush and not disturbed by the projecting tab, or any other part of the strip 152. Further, by placing all the strip 152 behind the substrate 100, there is no hanging tab or exposed tab extending beyond the outer perimeter 108 of the substrate, which allows the substrate to have a smooth outer profile and a clean look without unsightly tabs.

In an example, the access opening or hole 104 is larger than the tab 174 such that the end edge 174a of the tab is exposed through the perimeter of the access opening 104. With the end edge 174a exposed through the opening of the access hole 104, a user can slip a finger, a finger nail, or an object, such as a paper clip or a tip of a pen, behind the tab, which can be located behind the plane defined by the exposed surface 106a of the substrate 100, and pull the tab 174 through the access opening to then be gripped, grabbed, and/or pulled the strip to stretch the strip to release from the wall surface. Preferably, the dimension of the access opening 104 should be sufficiently large so that substantially all of the tab 174 of the strip 152 is exposed at the access opening 104. However, it is possible to implement a substrate in which the access opening is large enough to expose the end edge 174a and a majority of the tab 174 to be able to extract the tab through the access opening 104 from a location behind the exposed surface 106a. For example, the end edge 174a of the tab can be exposed through the access opening 104 and be grippable or extractable with the access opening 104 being smaller than the overall size of the tab. However, it preferred to have an access opening that is about the same size or larger than the size of the tab, such as 100% to about 200% larger than the area of the tab.

FIG. 4 also shows a double-tab access opening-type 104b for use with two back-to-back strips 152. However, it is possible to use a single adhesive strip 152 where a double-tab access opening-type 104b is provided. Thus, the double-tab access opening-type 104b can accommodate situations in which only a single strip 152 is used or when two back-to-back strips 152 are used to provide added holding strength. The two strips 152 can be applied to the backside 106b of the substrate 100 and oriented so that the two tabs 174 from the two strips are adjacent one another and both tabs 174 are exposed through the perimeter of the double-tab access opening 104b. In an example, the dimension of the double-tab access opening 104b is about the same size or sufficiently large compared to the two back-to-back tabs 174 such that the end edges 174a of the two tabs 174 are exposed through the perimeter of the access opening 104b. With the end edges 174a of the two tabs exposed through the opening of the access hole 104b, a user can slip a finger, a fingernail, or an object, such as a paper clip or a tip of a pen, behind each tab and then pull the tab 174 through the opening to then be gripped, grabbed, and/or pulled to release the strip from the wall surface. In other examples, the dimension of the access opening 104b is larger than the two tabs 174 such that the entire contours of the two tabs are exposed through the perimeter of the access opening 104b. In some examples, the two back-to-back tabs of the two strips applied to the substrate may overlap when used with the two-tab access opening 104b so that only one tab is entirely exposed through the access opening while the other tab is completely hidden behind the first tab or partially hidden behind the first tab.

In still other examples, two back-to-back strips 152 can be used with the single-tab access opening-type 104a by staggering or overlapping the two tabs such that one of the two tabs is completely or partially covered by the other tab when viewing through the perimeter of the access hole 104a. For discussion purposes, a substrate 100 with one or more double-sided adhesive strips 152 adhered to the substrate may be referred to as a mount-ready substrate 101.

By utilizing access holes or openings 104 and double-sided adhesive strips 152, the tabs 174 on the strips can be hidden behind the body 102 of the substrate 100 and not exposed at the perimeter 108 of the body. In some instances, having no tab projecting from the edge of the perimeter 108 improves aesthetics and can provide the substrate 100 with an overall smaller profile compared to the same substrate in which the tab projects from the edge of the outer perimeter, which may require a second substrate be placed over the first substrate to extend beyond the outer perimeter of the substrate to hide the protruding tab. With the present substrate, a tab 174 or tabs 174 visible at an access opening 104 can be hidden by an object hung to the substrate or by a cover plate (FIG. 7A) mounted over the access opening without having to extend beyond the outer perimeter 108 of the substrate, thereby minimizing the outer profile of the substrate.

FIG. 5 shows a magnet element 180 usable with substrates 100 of the present invention. The magnet element 180 is shown as a cylindrical rod or a stub but can embody other shapes, such as spherical, polygonal, flat, or irregular shapes. The magnet 180 can be of the neodymium magnet-type, Samarium cobalt (SmCo) magnet-type, Alnico magnet-type, NdFeB magnet-type, and ferrite magnet-type, which is also known as ceramic magnet. Ferrite magnets are preferred for their availability and low cost. After suspending a mount ready substrate 101 on a wall surface with non-destructive means that does not require drilling and/or nailing, as discussed elsewhere herein, one or more magnet elements 180 can be used to secure an article to the substrate to thereby suspend the article on the wall, via the substrate, without having to resort to drilling and/or nailing. This capability is especially useful where nailing and/or drilling is not allowed or where the user does not desire to create, such as to a front door, to a granite slab, to a glass surface, or to a tile surface. In some examples, plastic or non-metallic over layer may be coated or placed over the magnet element 180 for aesthetics. The over layer may also be provided with a lip or a raised gripping section to facilitate using the magnet element.

FIG. 6 shows several magnet elements 180 placed in magnetic contact with the body 102 of the metallic mount ready substrate 101, to the exterior or exposed side 106a of the substrate 100. In practice, a user can selectively place a plurality of magnet elements 180 anywhere along the length of the substrate as necessary to suspend the particular shape, size, and contour of the article to suspend. Thus, the number and locations of the magnet elements 180 shown in FIG. 6 are exemplary only.

In alternative embodiments, rather than securing magnet elements 180 to the exposed surface 106a of the substrate 100, magnet elements 180 may be placed on the backside surface 106b of the substrate 100. For example, a single strip or sheet of magnet element 180, similar in shape as the body 102 of the substrate, may be bonded to the backside of the substrate thereby converting the substrate to a magnetizable surface, such as a magnetized substrate. In other examples, sections or pieces magnet elements 180 may be used on the backside of the substrate instead of a single large piece, which is preferred to avoid creating access holes through the single piece magnet element to accommodate the access openings 104. Where a magnetized substrate is used, the double-sided adhesive strips 152 may be applied to the surface of the substrate or to the surface of the magnet element(s) secured to the substrate.

In yet another example, the substrate 100 is made from a non-metallic material, such as a plastic material. Magnet elements 180 may then be placed on the backside surface 106b of the non-metallic substrate 100. For example, a single strip or sheet of magnet element 180, compatible to the shape of the body 102 of the non-metallic substrate, may be bonded to the backside of the non-metallic substrate thereby converting the non-metallic substrate to a magnetizable surface, such as a magnetized substrate. In other examples, sections or pieces of magnet elements 180 may be used instead of a single large piece, which is preferred to avoid creating access holes through the single piece magnet element to accommodate the access openings 104 on the non-metallic substrate.

FIG. 7 shows a flag string 188 hung to a mount-ready substrate 101, which may be suspended on a wall surface via one or more strips 152. The flag string 188 may be hung to the mount-ready substrate 101 via one or more magnet elements 180, which can stick to the exterior surface 106a of the substrate 100 via magnetic attraction. The magnet elements 180 can provide surface from which to tie the flag string 188 to suspend the flag string. In other examples, magnet elements can be used directly over parts of the flag string 188 with parts of the flag string located between the magnets 180 and the surface of the substrate 100 to magnetically clamp the flag string to the substrate. While only two magnet elements 180 are shown, any number of magnet elements may be used to hold up the flag string 188, such as 3, 4, 5, 6 or more. In other examples, the article to be hung the substrate can be decorative vines, string lights, spaced apart objects, such as school banners, hats, clothing items, homework, memorabilia, etc., to name a few non-limiting examples.

FIG. 7A shows an exemplary cover plate 190 that is usable for covering an access hole 104 located on a substrate 100 and a mount-ready substrate 101 of the present invention. The cover plate 190 may be useful where an access hole 104 of a mount-ready substrate 101 is exposed after hanging one or more articles to the substrate. However, where an access hole 104 is covered by an article, such as shown in FIGS. 9-13 and 16, the cover plate can be omitted.

In an exemplary embodiment, the cover plate 190 can have a body 192 made of the same material as the substrate 100 for which the cover plate is used to cover the access hole 104. In other examples, the body 192 can be made from a different material than that of the substrate, which is less preferred. The body 192 can be sized to completely cover the access hole 104. Where the substrate 100 is made from a metallic material, the body 192 can also be made from a metallic material and the backside of the body can be equipped with a magnet element 180, such as a magnetic plate, sheet or multiple metallic plates or sheets. The magnet element 180 can be bonded to the backside of the cover plate 190, such as with a permanent adhesive or a bonding material. Once placed over the access hole 104, the cover plate 190 covers the access hole and provides the mount-ready substrate 101 with a clean aesthetic look. In some examples, the cover plate 190 can be made from a plastic material with a stainless steel looking finish to match the finish of the substrate 100. The cover plate 190 can be provided with a lip or projection, or a plurality of spaced apart lips or projections, to removably engage the perimeter of the access opening 104.

FIGS. 8A-8E and 8G show exemplary alternative substrates 100 in accordance with aspects of the invention. The present substrates are similar to other substrates discussed elsewhere herein with a few exceptions. In the present embodiment, each of the substrates 100 has a body 102 and a single access opening 104. The body 102 can be made from a metallic material and can have a perimeter 108 of different elongated geometries, such as generally rectangular shape, oval shape, rectangular shape with one curved end, rectangular shape with two curved ends, round shape, etc. The access opening 104 on each substrate can also have different shapes, but preferably with at least one straight edge that is aligned with where the tab of a double-side adhesive strip is to be placed, as previously discussed. Each substrate 100 can have a body 102 that is about the same size or larger than that of the strip 152 to be used. In an example, each substrate is about 1-inch wide, at its widest width, and about 2.5-inches tall. However, the dimensions are not limited and in other examples the dimensions can be different.

Each of these substrates 100 and mount-ready substrates 101, wherein a double-sided adhesive strip 152 is adhered to the backside 106b of the substrate 100, has an overall surface area that is larger than the surface area of the strip 152 by only about 1.5 to about 8 times the surface area of the strip may be referred to as an individual or single utility substrate 100" or an individual or single utility mount ready substrate 101". In general, each individual utility substrate 100" has a single access hole 104 for use with a single strip 152, although two end-to-end strips 152 may also be used with the substrate. A plurality of individual utility substrates 100" and a plurality of single utility mount ready substrates 101" may be used in place of or in addition to a larger substrate that has a body with two or more access holes 104. For example, when mounting a large article on a wall, four spaced apart single utility mount ready substrates 101" may be used to support the four corners of the large article instead of a single large substrate having two or more access holes 104.

A double-sided strip 152 can attach to the backside 106*b* of the substrate 100 to define a mount-ready substrate 101, which can then adhere to a wall surface. An object can then mount to the mount-ready substrate 101. For example, a banner or a concert ticket can attach to the mount-ready substrate 101 of FIG. 8A, 8B, 8C, 8D, 8E, or 8G, such as with a magnet element 180 (FIG. 5) clamping the article between the magnet and the substrate 100. In other examples, an article can be equipped with a magnet element and then the article is placed in magnetic contact with the mount-ready substrate 101. For example, a flashlight with a magnetic base can magnetically attach to the substrate without a separate magnet element.

In some examples, multiple mount-ready substrates 101 shown in FIG. 8A, 8B, 8C, 8D, 8E, or 8G may be used to suspend a single large article or object. For example, four mount-ready substrates 101 may be suspended on a wall surface to form four corners of a shape. Then a large article, such as a large poster, may be mounted to the four suspended mount-ready substrates 101 using magnet elements to magnetically clamp the large poster. As another example, two spaced apart mount-ready substrates 101 shown in FIG. 8A, 8B, 8C, 8D, 8E, or 8G may be used to suspend the flag string 188 of FIG. 7 rather than the single elongated substrate of FIG. 7. In other examples, three mount-ready substrates 101 may be used or more than four mount-ready substrates may be used to suspend an article, such as five, six, seven, either or more than eight mount-ready substrates.

FIGS. 8E and 8G show substrates 100 and mount-ready substrates 101 with an integrated hook 196. The integrated hook 196 may be formed by punching the perimeter of the access opening 104 with a couple of extended slots or slits and then bending the substrate at the punched opening to form the integrated hook 196. Thus, the integrated hook 196 has a bend adjacent the two slits. FIG. 8F is a side view of the substrate 100 of FIGS. 8E and 8G, which show the hook projecting outwardly of the exposed or exterior surface 106*a* of the substrate. While a magnet element (FIG. 5) may be used with the mount-ready substrate 101 of FIG. 8E or 8G with the integrated hook 196, the mount-ready substrate 101 is ready to receive a wire attached to an article, such as to a picture frame, to mount the article to the substrate, and therefore to a wall, without nailing or drilling the wall. Advantageously, the embodiments with the integrated hook 196 allow for both hanging a wire and accessing a tab of a strip at the same access hole, all within the outer perimeter of the substrate. In other examples, the hook 196 may be formed separately or spaced from the perimeter 109 of the access opening 104. For example, a curved or rounded arc, such as 180-degrees to 300-degrees or a circle, or three connected edges can be punched at a location on the body of the substrate, spaced from the perimeter of the access opening 104, and then bent to form a hook spaced from the access opening. Thus, the integrated hook 196 can be spaced from the access opening and located adjacent a slit with a bend.

In the various embodiments discussed herein, the mount ready substrate 101 may be removed from a wall surface by first exposing the one or more access holes 104 on the substrate, if not already exposed, and then pulling, grabbing, and/or gripping the one or more tabs 174 on the strips used to suspend the substrate at the one or more access holes to stretch the one or more strips 152, preferably one at a time, until the one or more strips completely separate from the wall surface. The substrate should be firmly gripped while the tab is being pulled.

Figure 9:
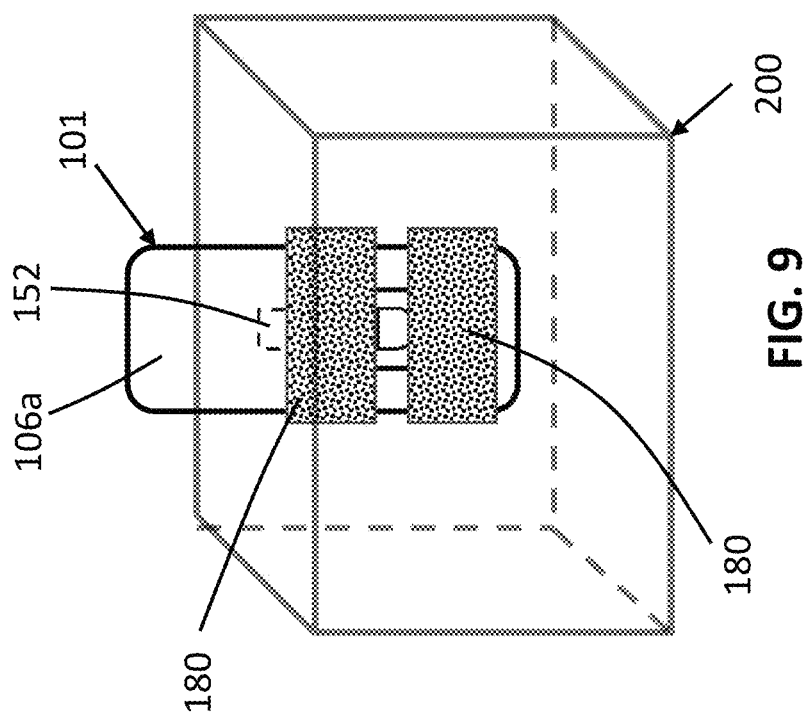
FIG. 9 shows an article magnetically attached to a mount ready substrate.

FIG. 9 shows a mount-ready substrate 101 suspended on a wall surface (not shown) without a nail or a screw. In other words, the mount ready substrate 101 may be mounted to a wall surface with only a double-sided adhesive strip 152, as discussed elsewhere herein. Once mounted, an object or article 200 may be suspended from the mount-ready substrate 101. As shown, the article 200 is a small basket, such as a small plastic or light weight meshed/wired metal basket, having one or more magnet elements 180 secured thereto. The basket may be used to temporarily hold keys, remote controls, loose articles, etc. The article 200 with one or more magnet elements 180 secured thereto, such as by adhesive, bonding, straps, fasteners, or combinations thereof, is then magnetically hung or attached to the exposed surface 106*a* of the mount-ready substrate 101. Thus, in a restrictive indoor environment where drilling and/or nailing a wall is not permitted or desired, a user can readily hang or suspend an object or article 200, such as a basket, on the wall without nailing or drilling. In other examples, the article 200 can be something other than a basket, such as shelf or a hook, or an item placed on the shelf or the hook, such as a keychain or a hat.

Magnetic hooks are widely available on Amazon.com for use on refrigerator doors. However, where a user desires to use the magnetic hooks at a location other than the kitchen, finding conveniently located metallic surfaces may be difficult. Thus, mount ready substrates of the present invention provide ready use kits or devices for creating metallic and/or magnetic surfaces just about anywhere desired for suspending articles, such as for attaching the widely available magnetic hooks.

FIG. 10 shows the mount-ready substrate 101 of FIG. 8E suspended on a wall surface (not shown) with a double-sided adhesive strip 152. The substrate 100 has an integrated hook 196 and a wire, rope, or hook line 212 of a picture frame 210 hung on the hook to suspend the picture frame 210 on the wall surface, without nailing and/or drilling. If the picture frame is large and/or heavy, additional strips may be used with the substrate 100 to suspend the mount ready substrate 101. Alternatively, a substrate with multiple access holes to allow multiple strips or multiple substrates may be used to hang the large and/or heavy frame.

Figure 11:
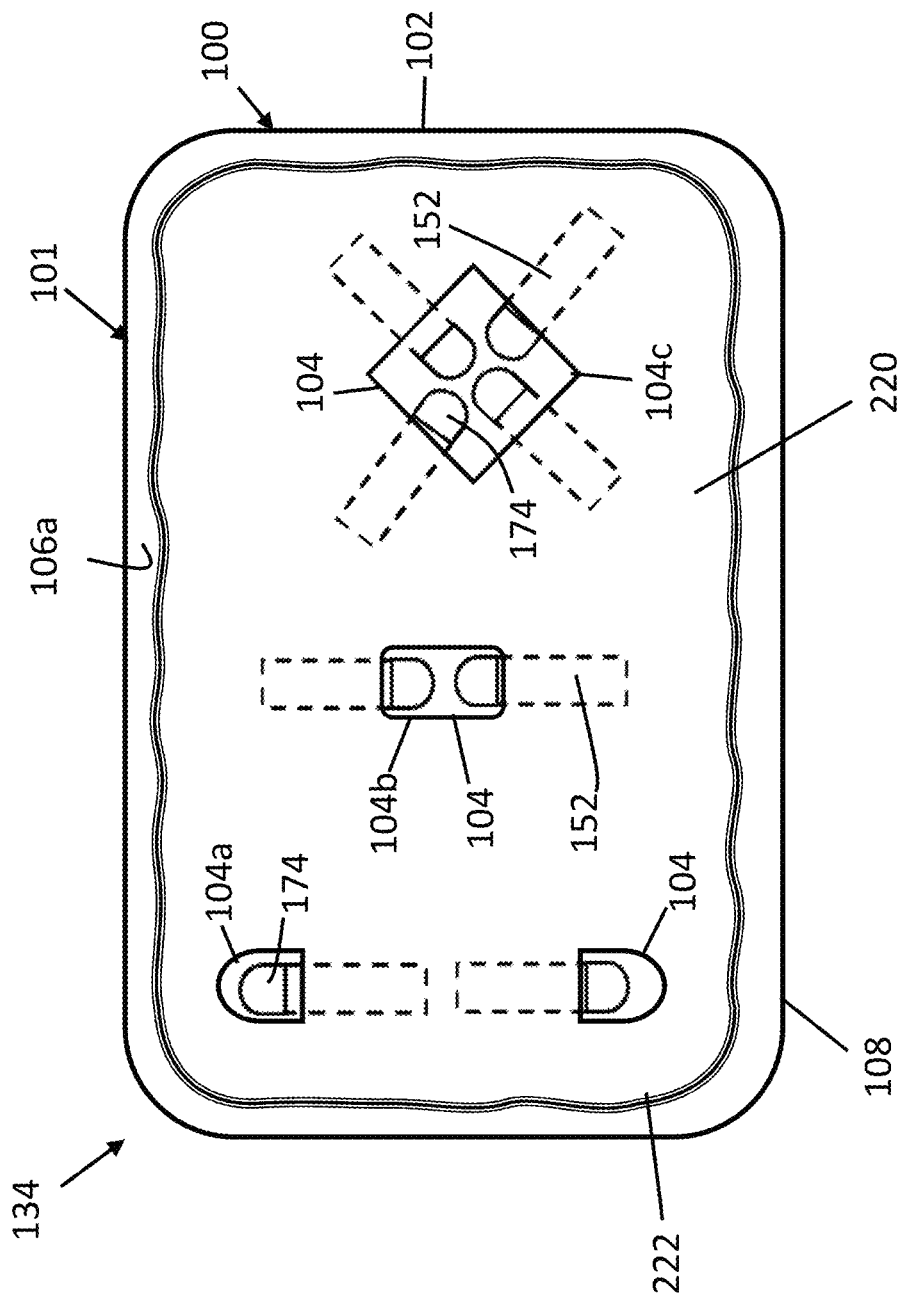
FIGS. 11-13 show different embodiments of a mount ready substrate having a magnetic dry erase whiteboard sheet attached to an exposed surface of the substrate.

FIG. 11 shows a mount-ready substrate 101 having a plurality of access holes 104. Although the access holes 104 shown include a mixed of the single-tab access opening type 104*a*, the double-tab access opening type 104*b*, and the large access opening type 104*c* for three or more tabs 174, the access holes 104 can be consistent throughout, such as being of only the single-tab access opening type, only the double-tab opening type, or only the large access opening type. The large access opening-type 104*c* is understood to mean an opening having a dimension that is sized to allow three or more tabs 174 from three or more strips 152 to be gripped, grabbed, and/or pulled through the perimeter of the large access opening 104*c* to remove the strips 152. For example, three or four strips 152 can be placed end-to-end with the tabs 174 placed adjacent one another and be accessible through the large access opening 104*c*. The perimeter of the large access opening 104*c* is preferably a polynomial with three or more straight sides, although other shaped perimeters may be used, such as a round circle. The arc of the large round circle can provide a sufficiently flat or straight edge for extracting the tabs on the strips.

The substrate 100 of FIG. 11 is generally rectangular in shape with rounded corners and can be made from a metallic material. The width to height ratio of the body 102 of the substrate is approximately 4:3 or 16:9 with other ratios contemplated. In an example, the width of the substrate is 17-inches, with other dimensions contemplated, such as 12-inches wide and 20-inches wide. A plurality of access holes 104 can be provided across the surface of the large substrate 100, which can be of the single-tab access opening type 104a, a double-tab access opening type 104b, a large access opening type 104c, or combinations thereof.

The mount-ready substrate 101 of FIG. 11 can be suspended on a wall surface (not shown) via a plurality of strips 152, as previously discussed. A magnetic dry erase whiteboard sheet 220 with a perimeter 222 (shown schematically with a wavy line for viewing and discussion purposes) is placed in magnetic contact with the mount-ready substrate 101 and covers the plurality of access holes 104. The combination dry erase magnetic sheet 220 and mount ready substrate 101 may be called a portable dry erase writing system 134. The dry erase magnetic sheet 220 is widely commercially available, such as on Amazon.com and at big box stores such as Walmart, and typically come with straight perimeter edges. The dry erase magnetic sheet 220 is shown in transparency to show the access openings 104 underneath for discussion purposes only. Some of the body 102 of the substrate 100 is exposed underneath the dry erase magnetic sheet 220. In some examples, the access holes 104 may be dispersed in a pattern near the perimeter 108, near the corners of the body 102, and/or include a centrally located access hole 104. Properly located access holes 104 will allow for good distribution of the strips 152 on the substrate and an even support of the substrate for writing on the dry erase sheet 220, such as with dry erase markers. Further, by utilizing the access holes 104 of the present invention, the strips 152 used with the substrate are located behind the plane defined by the exposed surface 106a so that no uneven projection or bump is created, thereby allowing the dry erase sheet 220 to be attached to flat surface of the substrate without bumps.

In some examples, the size and perimeter of the dry erase magnetic sheet 220 and the perimeter of the mount-ready substrate 101 can be the same or substantially the same so that no part of the body 102 of the substrate is exposed beyond the perimeter 222 of the dry erase magnetic sheet 220. The portable dry erase writing system 134 may be mounted anywhere, such as on a wall surface of a dorm room, an office space, a conference room, a kitchen, or a bedroom, to name a few non-limiting examples. In some examples, rather than pairing one mount ready substrate 101 to one dry erase magnetic sheet 220, two or more mount ready substrates 101 may be placed side-by-side to then magnetically receive one or more dry erase magnetic sheets 220.

In alternative examples, a metallic substrate is provided without any access holes. Thus, when used with double-sided adhesive strips, the tabs on the strips are oriented so that they are exposed radially outwardly of the perimeter of the substrate, such as sticking out beyond the perimeter of the substrate. Used in this manner, the substrate can convert any wall surface to a surface that can attach to a magnet. Thereafter, articles or objects with a magnet may be used to magnetically attach to the metal substrate. In other examples, the substrate may include magnet sheets in the back or rear surface thereof, such as by bonding or gluing. Thus, the substrate may be converted to a magnetized surface that metal articles or objects can magnetically attach to.

Figure 12:
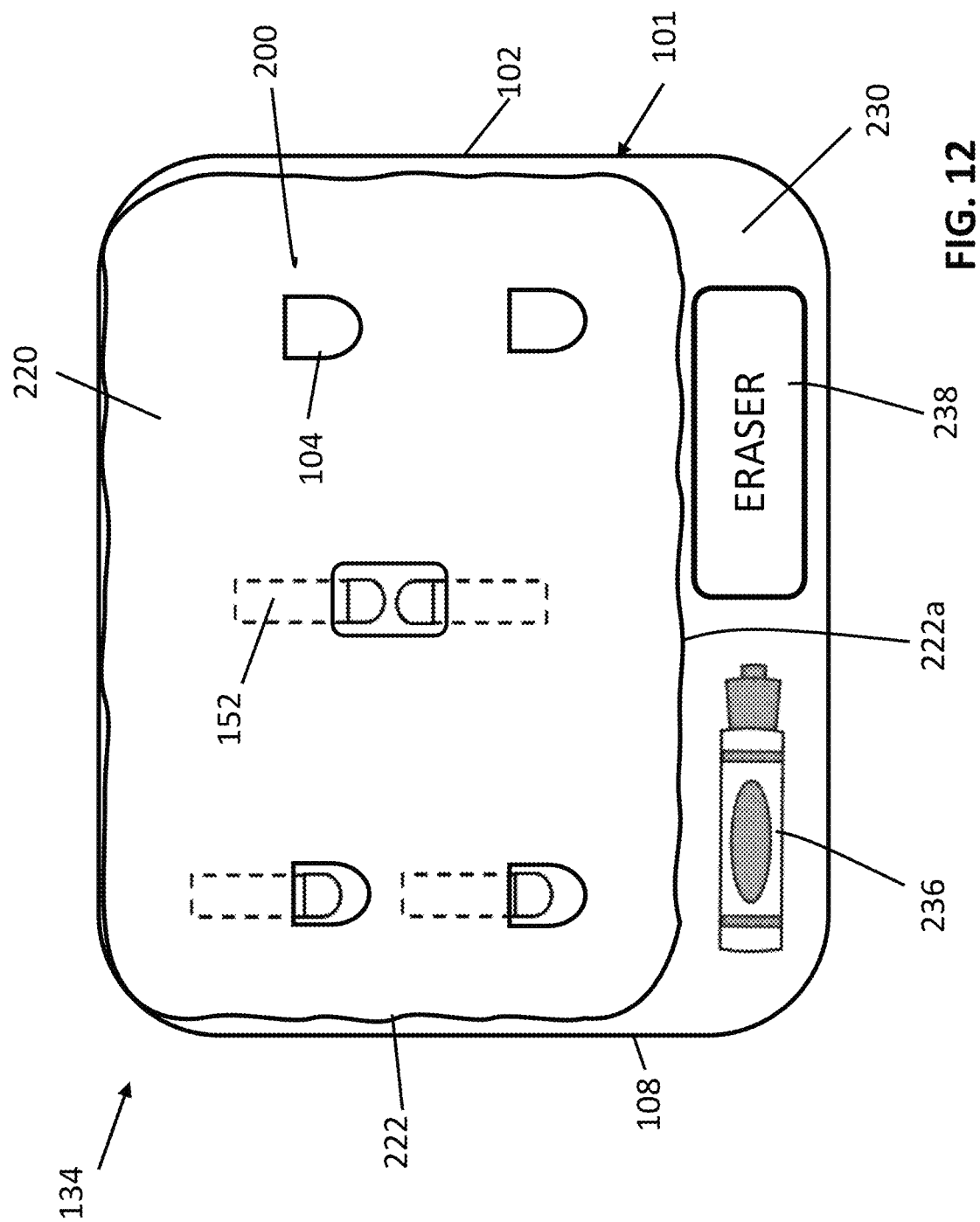

FIG. 12 shows a dry erase magnetic sheet 220 attached to a mount-ready substrate 101 and defining a portable dry erase writing system 134 similar to FIG. 11. However, in the present embodiment, the surface area of the body 102 of the substrate 100, and therefore also the perimeter 108 of the body 102, is increased so that an extended area of the substrate 100 extends beyond the lower perimeter 222a of the dry erase magnetic sheet 220 to define a holding area 230. Thus, one or more writing markers 236 and one or more dry marker erasers 238 can be magnetically attached to the holding area 230. Obviously, the one or more markers 236 and one or more erasers 238 should each include a magnet element to be able to magnetically attach to the holding area 230. If not, a separate magnet element 180 (FIG. 5) may attach to the article to then attach the article magnetically to the holding area 230. In yet another example, the substrate 100 may be provided with a magnet element and the one or more markers 236 and one or more erasers 238 can simply be provided with a metallic surface or element for them to magnetically attach. In still other examples, a magnet attached to a tray or basket can magnetically attach to the substrate or to the dry erase magnetic sheet. The markers and the erasers can then be placed on the tray or in the basket.

Figure 13:
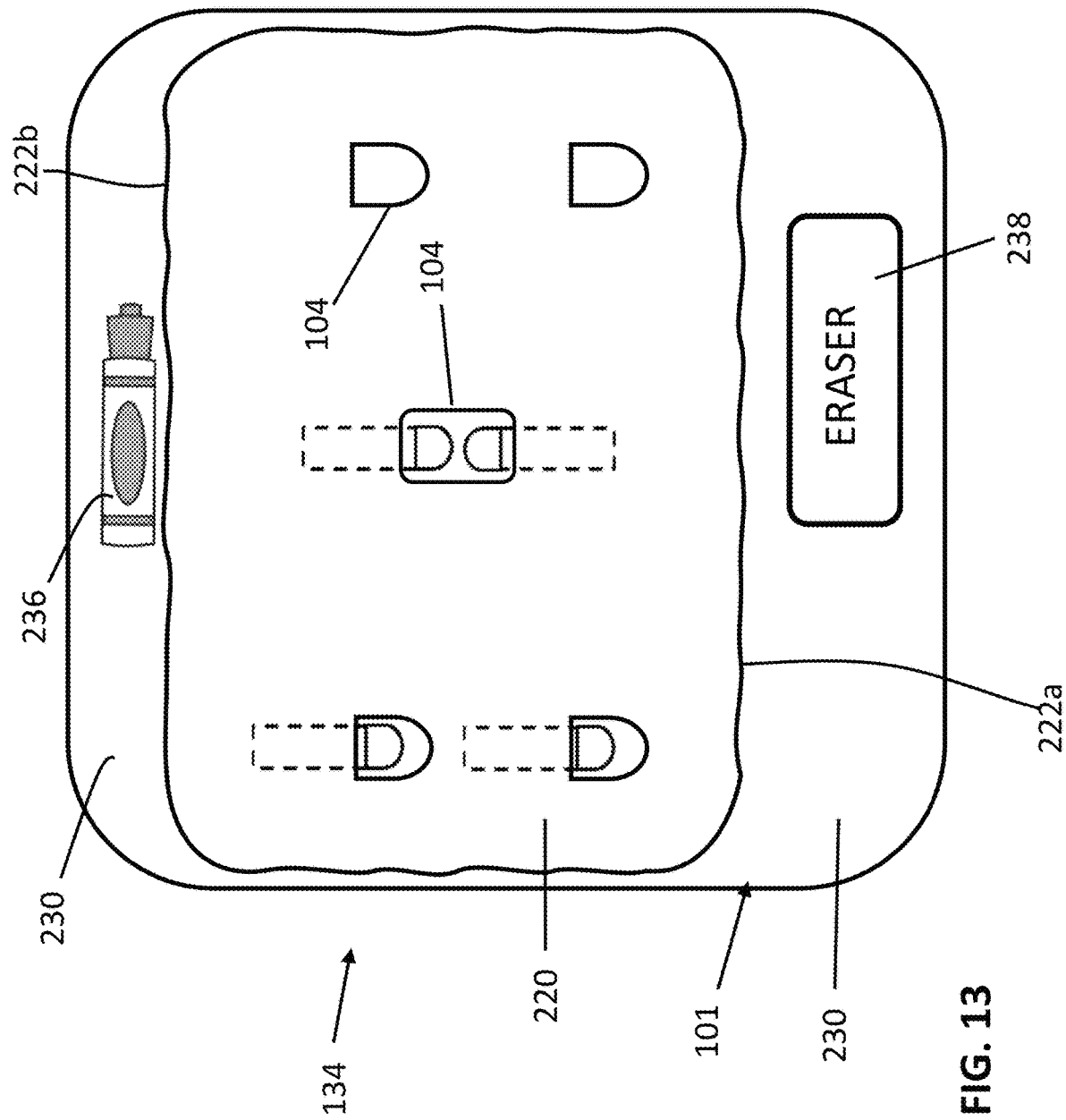

FIG. 13 shows a dry erase magnetic sheet 220 attached to a mount-ready substrate 101 and defining a portable dry erase writing system 134 similar to FIG. 12. However, in the present embodiment, the surface area of the body 102 of the substrate 100, and therefore also the perimeter 108 of the body, is increased so that two extended sections of the substrate 100 extend beyond the lower perimeter 222a and the upper perimeter 222b of the dry erase magnetic sheet 220 to define two holding areas 230, thereby providing greater holding areas or surfaces for multiple articles to magnetically attach thereto. In still other examples, the substrate size can be increased so that a border is provided around the entire perimeter of the magnetic dry erase surface, such as including the sides.

Figure 14:
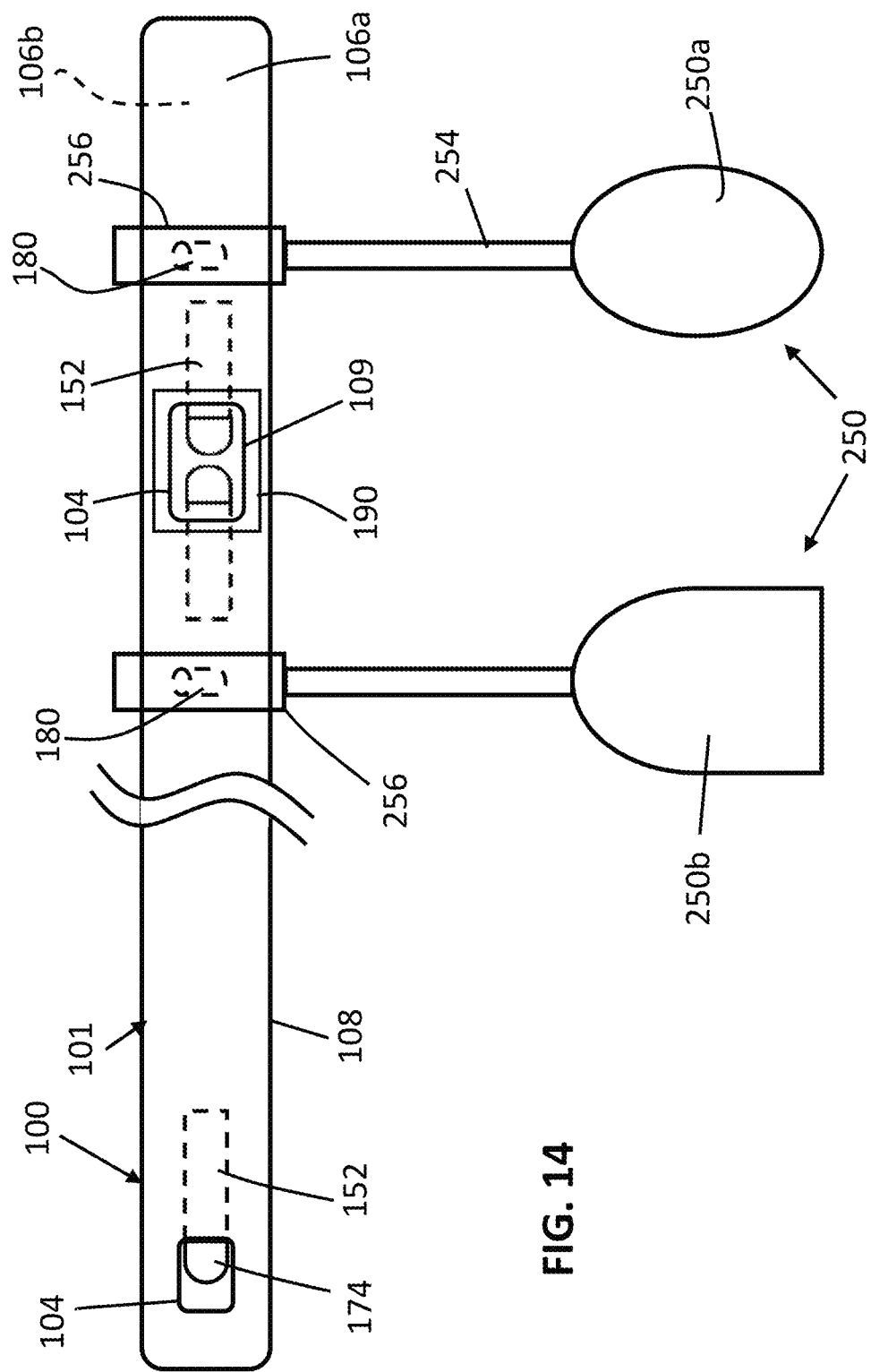
FIG. 14 shows a plurality of utensils magnetically attached to a mount ready substrate.

FIG. 14 shows a mount-ready substrate 101 mounted to a wall surface (not shown) via a plurality of strips 152. Two access holes 104 are shown, each with one or more tabs 174 exposed through the opening or perimeter of the access hole 104, which can be a single-tab access opening-type, a double-tab opening type, a large tab opening-type or combinations thereof. Depending on the length of the substrate 100 and the weight that the mount-ready substrate 101 is expected to hold, more than two access holes 104 and more than two strips 152 may be used.

The mount-ready substrate 101 may be mounted onto a wall as discussed elsewhere herein. In the present embodiment, a plurality of cooking utensils 250 may be mounted to the mount-ready substrate 101, which can be located on a wall of a kitchen, as an example. The cooking utensils shown include a solid spoon 250a and a solid turner or spatula 250b. In other examples, the utensils 250a, 250b can be slotted or there can be additional cooking utensils, such as one or more of a whisk, a draining spoon, a pizza cutter, a peeler, a strainer, a garlic crusher, a wine opener, a set of tongs, a kitchen knife, and measuring spoons, to name a few non-limiting examples.

Each cooking utensil typically has a shaft 254 and a handle 256. In an example, a magnet element 180 (FIG. 5) can be bonded or secured to the utensil, such as to the shaft 254 or the handle 256. In a preferred embodiment, a bore is molded with the handle 256 or drilled through the handle 256 to receive a magnet element 180, which can have a rod shape, or shaped as a stub. Then after the magnet element 180 is placed into the bore of the drilled handle, the bore and the opening to the bore is sealed, such as with an adhesive or an epoxy to define a magnetic handle 256a. Thus, to attach a utensil 250 to the mount-ready substrate 101, the user simply turns the magnetic handle 256a of the utensil 250 towards the mount-ready substrate 101 and then allowing magnetic attraction to take hold.

In the application of FIG. 14, the access holes 104 are exposed, thereby possibly diminishing the look and feel of the mount-ready substrate 101. To improve the aesthetic look of the mount-ready substrate 101, a cover plate 190 (FIG. 7A) can be placed over each of the access holes 104. The cover plates 190, which have magnet elements 180 secured thereto, can attach to the mount ready-substrate 101 via magnetism to then cover the plurality of access holes. Optionally, the access holes can be covered by plastic cover plates 190 having similar metallic surface finish, as previously discussed.

In alternative embodiments, as discussed above, the substrate 100 of FIG. 14 may be provided with one or more magnet elements on the backside 106b to convert the metallic body 102 to a magnetized substrate. For example, a single planar magnet element with cutouts that match the access openings 104 can be bonded to the backside 106b of the substrate. In other examples, a plurality of smaller magnetic planar elements may be bonded to the backside 106b to avoid having to form cutouts to accommodate the access openings 104 when using a single larger magnet element. The utensils 250 can then magnetically attach to the magnetized substrate without having to separately attach magnet elements to the utensils. For example, the metal end of the utensils can simply be placed against the exposed surface 106a of the magnetized substrate to magnetically attach to the substrate.

Figure 15:
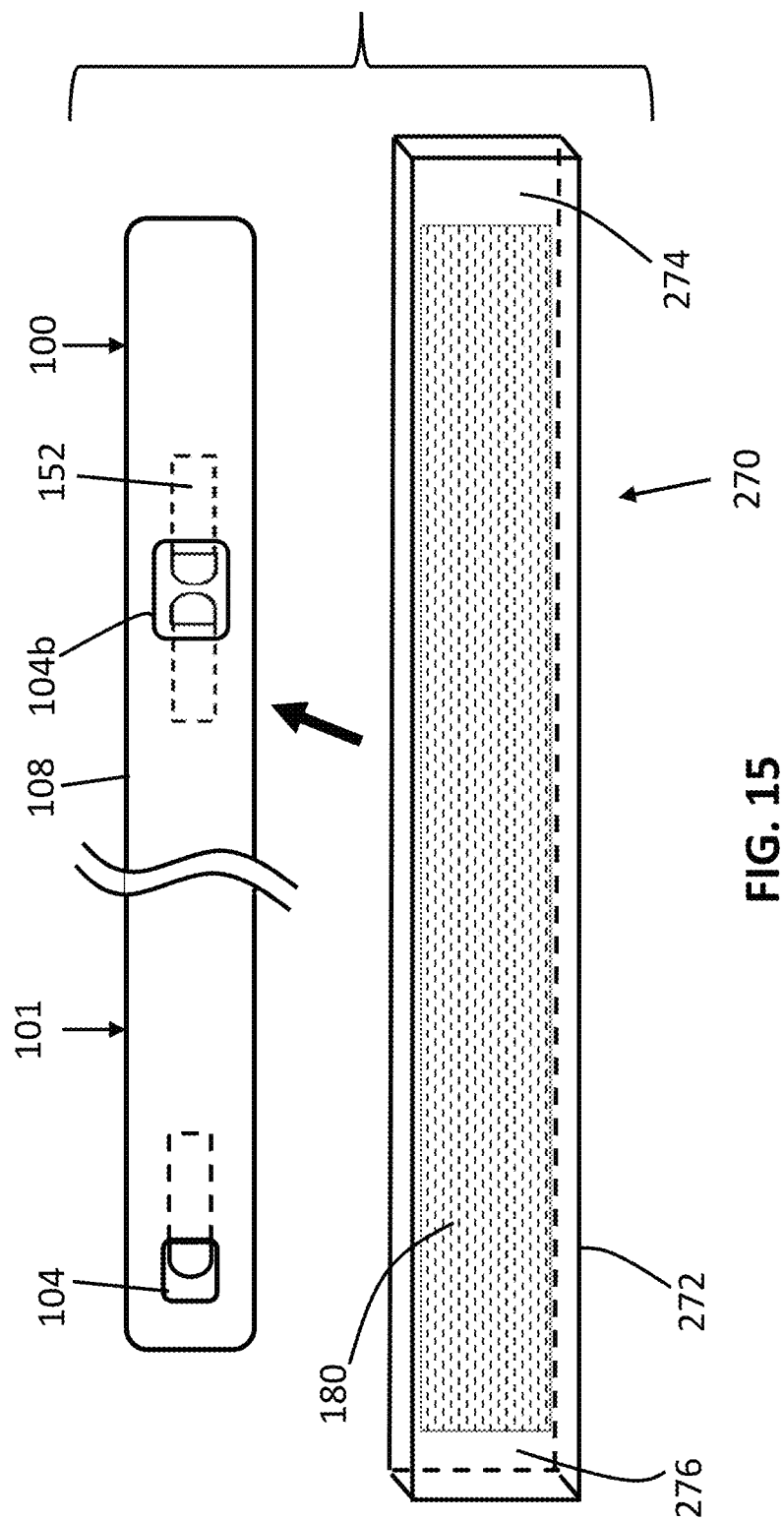
FIG. 15 shows a mount ready substrate and a magnetic mounting rack.

FIG. 15 shows a mount-ready substrate 101 mounted to a wall surface (not shown) via a plurality of strips 152, similar to the mount ready substrate of FIG. 14. In an example, the wall surface can be a granite surface of a kitchen and the mount-ready substrate is attached to the granite surface, without any nailing or drilling. Alternatively, the surface can be any surface that cannot be punctured or that the user does not want to puncture, such as a shower stall or a non-magnetic stainless steel surface, such as a refrigerator made with 316 SS material.

In the embodiment of FIG. 15, a magnetic mounting rack 270 is provided for use with the mount-ready substrate 101. The magnetic mounting rack 270 has a housing or body 272 having a length, a width, a depth, and a recessed space or cavity 274 behind the front layer or front rack surface 276. The body 272 is preferably made from a magnetic capable stainless steel material and has a magnet element 180 secured thereto, such as to the recessed space 274, by adhesive or bonding material. Less preferred, the body 272 may be made from a non-metallic material. The magnet element 180 can be a single magnet sheet or can be several individual magnet sheets or elements separately attached to the body 272, such as to the recessed space 274, to define a magnetized or magnetic mounting rack 270. The magnetized mounting rack 270 should be sufficiently large to completely surround or cover the perimeter 108 of the mount-ready substrate 101, when the magnetized mounting rack is magnetically attached to the mount-ready substrate 101.

Figure 16:
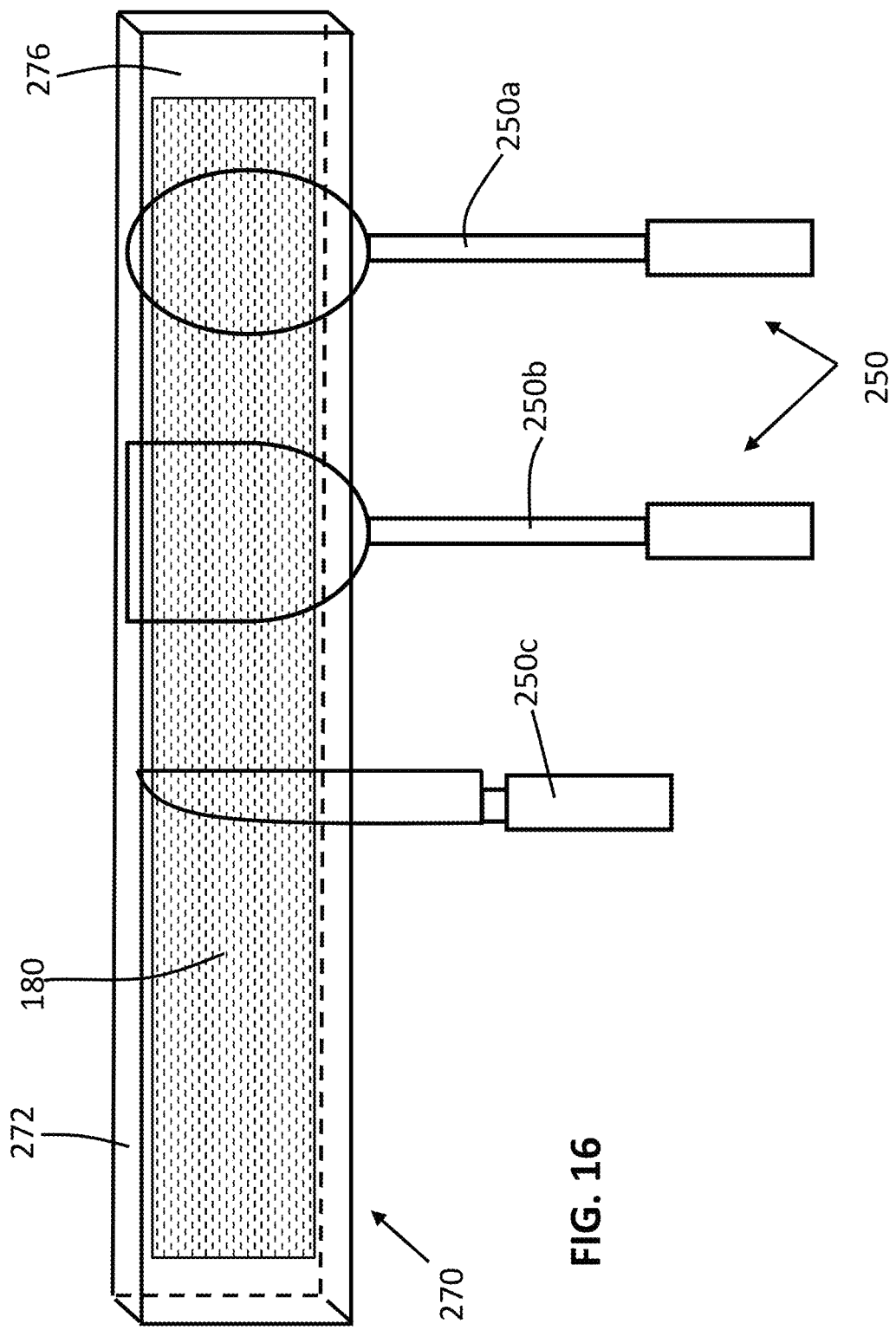
FIG. 16 shows the magnetic mounting rack attached to the mount ready substrate of FIG. 15 and wherein a plurality of utensils are magnetically attached to the magnetic mounting rack.

FIG. 16 shows the magnetized mounting rack 270 magnetically attached to a mount-ready substrate 101 (FIG. 15), which is suspended to a wall surface, such as a granite surface in a kitchen. Once attached, only the contour of the mounting rack 270 should be exposed. In other words, once mounted, only the shape of the housing or body 272 of the magnetized mounting rack 270 is exposed, which can represent a rectangular prism with a matte finish, a brushed finish, or a mirror finish. Less preferably, the substrate 100 can be exposed behind the body 272 of the magnetized mounting rack 270. Further, as the mounting rack 270 is provided with one or more magnet elements 180, ferromagnetic metals will stick or magnetically attract to the one or more magnet elements 180. Thus, certain stainless steel utensils 250 will magnetically attract to the magnetized mounting rack 270 without having to separately attach a magnet element to the utensil. In the example shown, a spoon 250a, a turner or spatula 250b, and a kitchen knife 250c, all made from a stainless steel material, can be magnetically hung or attached to the mounting rack 270 for decorative display in the kitchen.

In an example, a kit may be provided in a package or a packing box. The kit may include a substrate 100 with one or more access holes 104 as described elsewhere herein, a plurality of double-sided adhesive strips 152, and a magnetized mounting rack 270. The mounting rack kit may further include a plurality of kitchen utensils. Alternatively, a separate package or packing box may contain the plurality of kitchen utensils.

With reference now to FIG. 17, a non-metallic substrate 100 is shown comprising a plurality of access holes 104, which can be a single-tab access hole, a double-tab access hole, a large access hole, or combinations thereof. A plurality of strips 152 can be applied to the backside 106b of the substrate 100 to form a mount ready substrate 101 and the mount ready substrate attached to a wall surface (not shown) as previously described. In the present embodiment, a plurality of integrated hooks 280 are provided with the body 102 of the substrate. For example, the hooks 280, schematically shown, can be molded with the body 102 during formation of the non-metallic body. There can be more than two integrated hooks 280 formed with the body 102, which can have a length and a width of various dimensions and sizes. The hooks 280 can be spaced along the length or width of the body and used to hang articles, such as a hat, a key chain, a string light, etc.

In an example, a cover plate 190 (FIG. 17A) with a body 192 is provided with a plurality of tines or tabs 286 for engaging corresponding slots 288 on the substrate 100 to cover the access hole 104. The tines 286 can reversibly snap into corresponding slots 288 on the substrate 100 to improve the aesthetic of the mount-ready substrate 101. In some examples, the location of the tines and the slots can reverse. Multiple cover plates 190 may be used to cover multiple access holes 104. In alternative embodiments, a projection or lip, or multiple projections or lips, extend from the underside surface of the body 192. The projection or multiple projections defining a shape that is dimensioned to frictionally engage, and possibly pressed fit into, the perimeter of the access hole to removably engage the access hole.

With reference now to FIG. 18, a non-metallic substrate 100 is shown comprising a plurality of access holes 104, which can be a single-tab access hole, a double-tab access hole, a large access hole, or combinations thereof, similar to the substrate 100 of FIG. 17. A plurality of strips 152 can be applied to the backside 106b of the substrate 100 to form a mount ready substrate 101 and the mount ready substrate attached to a wall surface (not shown) as previously described. One or more cover plates 190 may be attached to the exposed surface 106*a* of the substrate 100 to increase the aesthetic of the substrate.

In the present embodiment, an integrated shelf 290 is provided with the body 102 of the substrate 100. For example, the shelf 290 can be molded with the body during fabrication of the substrate 100. The combination substrate 100 and shelf 290 is known as an angle jamb or angle stock. The shelf 290 provides a surface 292 for supporting articles, such as a prescription bottle, a keychain, and various knick knacks.

FIG. 19 shows a product package 300 having a housing and a cavity for storing or accommodating items inside the cavity. In an example, the housing can be a box. In the embodiment shown, the product package 300 comprise a backing 158 and a blister pack 160 attached thereto, similar to that of FIG. 2. In the example shown, a plurality of double-sided adhesive strips 152 and a plurality of substrates 100 are located in the cavity 162 of the blister pack 160. The substrates 100 can be one of the substrates discussed elsewhere herein and each substrate can comprise an access hole 104 for retrieving a tab of a strip 152, as previously discussed. The substrates can be made from metallic or non-metallic materials. The size of the product package 300 and the number of strips 152 and substrates 100 contained therewith can vary from a few to a plurality, such as from 2 to 20 or higher. In some examples, at least some or all of the substrates 100 are made from a magnetizable metallic material, or a metal that attracts magnet. The at least some or all of the metallic substrates 100 can be without access openings 104 and may be used to convert a surface to a magnetizable surface. Optionally, one or more magnet elements may be included with the product package 300.

FIG. 20 shows a product package 310 having a backing 158 and a blister pack 160 attached thereto, similar to that of FIGS. 2 and 19. In the example shown, a plurality of substrates 100 and magnet elements 180 are located in the cavity 162 of the blister pack 160. Optionally, a plurality of strips 152 may also be included. One or more of the magnet elements 180 can be attached to an article so that the article can magnetically attach to the substrate 100, as previously discussed. An adhesive tube or an epoxy tube 312 may be included with the product package for attaching the one or more magnet elements 180 to the article. The size of the product package 310, the number of substrates 100, and the number of magnet elements contained therewith can vary from a few to a plurality, such as from 2 to 20 or higher. In some examples, at least some or all of the substrates 100 are made from a magnetizable metallic material, or a metal that attracts magnet, and can be without access holes 104.

Figure 21:
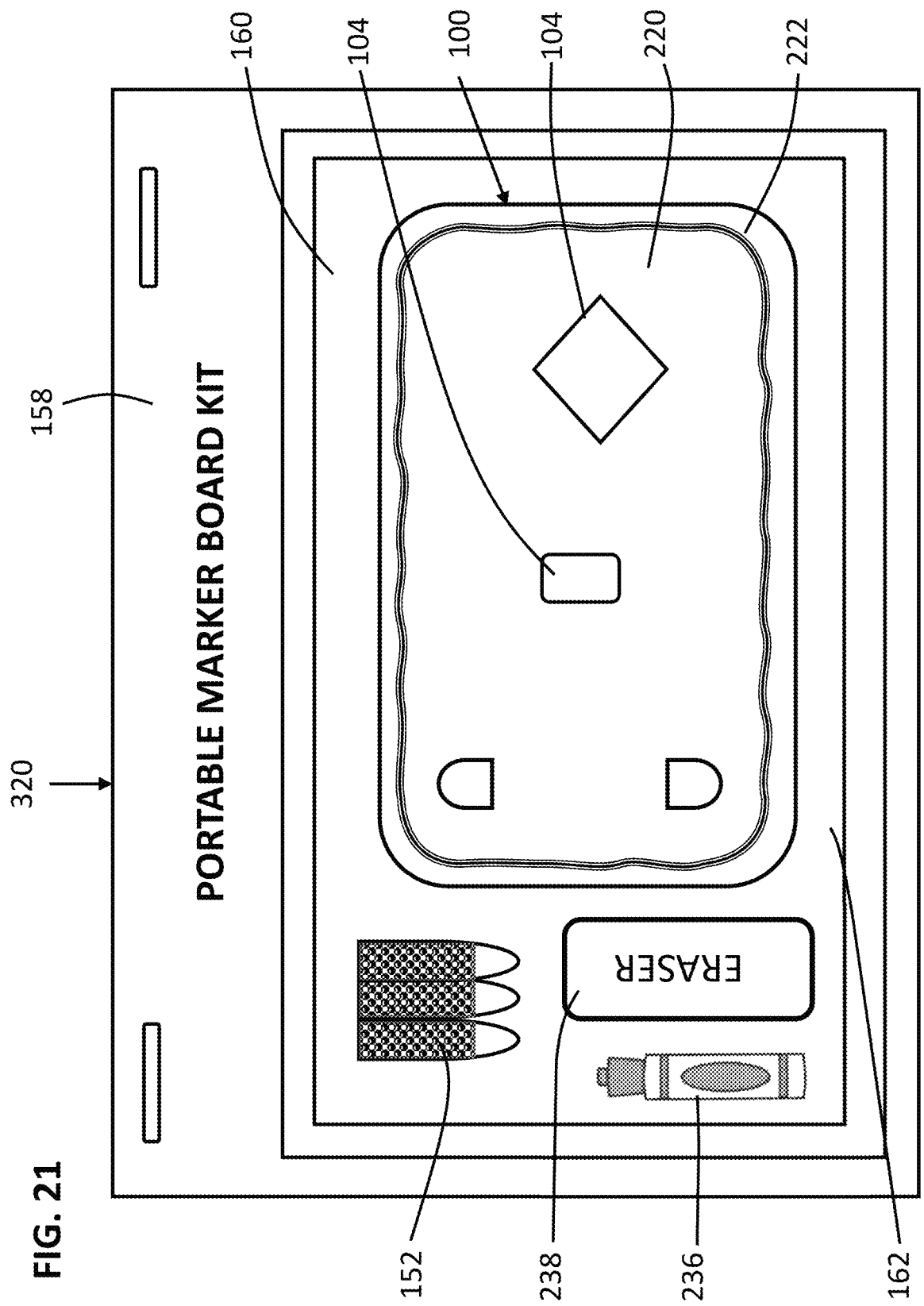
FIG. 21 shows a product package having a plurality of strips, a substrate, a magnetic dry erase whiteboard sheet, a dry erase marker, and a dry eraser located inside the cavity of the product package.

FIG. 21 shows a product package 320 having a backing 158 and a blister pack 160 attached thereto, similar to that of FIGS. 2, 19, and 20. In the example shown, a plurality of strips 152, a substrate 100 with a plurality of access holes 104, and a magnetic dry erase whiteboard sheet 220 with a perimeter 222 are located in the cavity 162 of the blister pack 160. The substrate 100 with the plurality of access holes 104 and the dry erase whiteboard sheet 220 are similar to those described elsewhere herein. In yet other examples, one or more metal substrates 100 without access holes and two or more adhesive strips may be provided with the product package 320. Optionally, one or more metal elements may be included with the product package 320 for magnetically attaching to the one or more substrates.

Optionally, one or more dry erase markers 236 may be included with the product package 320. Optionally, a dry eraser 238 may also be included with the product package 320. The one or more dry erase markers 236 and the dry eraser 238 may each include a magnet element or a metal component to magnetically attach to the dry erase whiteboard sheet 220 and/or the substrate 100. Components of the product package 320 may be assembled and suspended on a wall surface as discussed elsewhere herein.

With reference now to FIG. 22, an exploded view of a display frame assembly 326 is shown comprising a substrate 100 and a display frame 328, which are usable together as a combination, as shown in FIG. 23. The display frame assembly 326 has a surface 329 that may be used, such having a usable or application surface, to more permanently attach or secure an article thereto without physically alternating the wall surface that the mount ready substrate 101 will attach to. As an example, a light string is designed to mount to a wall surface with permanent adhesive. Doing so would result in damaging, marring, or degrading the wall surface. Thus, the display frame assembly 326 of FIGS. 22 and 23 may be used to receive the light string, such as to mount the light string thereto or thereon, without damaging, marring, or degrading the wall surface since the mount ready substrate 101 is removable from the wall surface, as further discussed below. In short, the display frame assembly 326 can provide an artificial or faux surface for which to secure an article without destroying the base wall surface, such as a kitchen wall, a cabinet surface, an office all, a desk wall, a back splash, etc.

In an example, the substrate 100 may be provided with a plurality of double-sided adhesive strips 152 to form a mount-ready substrate 101, as previously discussed. The substrate 100 comprises a body 102 having at least two access holes or openings 104 spaced along the surface of the body 102, which has a length and a width, of about 1 or more feet in length and about 2 or more inches in width. The substrate 100 can be provided with extending flanges or sidewalls 330. For example, two opposing sidewalls 330, 330 can extend from two edges of the body 102. The sidewalls 330, 330 can be unitarily formed with the body 102 and the body with the sidewalls can be called a flanged substrate 103. In an example, the flanged substrate 103 can be made from a sheet metal or from a magnetic stainless steel material, which is understood to mean stainless steel that is magnetizable. In an alternative example, the flange substrate 103 may be made from a plastic material, such as from plastic injection or extrusion. One or both sidewalls 330, 330 can be provided with a mating surface or mating lip 332, such as a detent, projection or tab.

In an example, a flanged substrate, which has a planar body with one or more sidewalls or flanges extending upwardly or outwardly of the planar body, can provide a limiting surface for an article so that the article is preventing from sliding, shifting, or moving when abutting the one more sidewalls or flanges of the flanged substrate. The flanged substrate may have or more access holes, each with a perimeter located inwardly of an outer perimeter of the planar body.

The display frame 328 can be provided with a body 336 having two flanges or sidewalls 338, 338. The display frame 328 may be made from the same material or from a different material than the material of the flanged substrate 103. For example, the flange substrate may be made from plastic and the display frame made from a metal material. The length and width of the display frame 328 should corresponding to the length and width of the flanged substrate 103 so that the two can couple or engage, as shown in FIG. 23 and further discussed below. In an example, the display frame 328 is sized and shaped to engage the flange substrate 103. For example, the two sidewalls 338, 338 of the display frame 328 can be provided with corresponding mating surfaces or mating lips 340, 340 to engage the mating surfaces or mating lips 332, 332 on the flanged substrate 103. In alternative examples, rather than having mating surfaces or mating lips, adhesive, glue, bonding, or fasteners may be used to secure the corresponding sidewalls or flanges together. For example, set screws may be used to secure the two sets of flanges 330, 338 together.

The display frame 328 has a usable surface 329. The usable surface 329 has an exposed or exterior surface 340. An object or article, such as a string light, a picture frame, etc. can hang on the usable surface 320. The usable surface 329 may be provided with one or more through holes 342. A wire or cable may be routed from the article, through one of the through holes 342 and located inside the receiving space 344. The receiving space 344 can hide the wire or cable or other items from view. For example, permanent adhesive may be applied to the exterior surface 340 or a screw may be driven through the usable surface 340 to hang the string light or the picture frame without having to apply the permanent adhesive directly to the base wall surface or to screw into the base wall surface.

FIG. 23 shows the display frame assembly 326 of FIG. 22 in an assembled state, and mounted to a base wall surface, such as to a kitchen wall, to an office all, to a garage wall, to a cabinet wall, to a backsplash, etc. As shown, the display frame 328 is engaged to the flanged substrate 103. The engagement can be through matching detents, adhesive, and/or fasteners at the corresponding flanges 330, 338, as previously discussed. Once assembled, the working surface 329 may be used to permanently secure an article, as such a string light, a picture frame, etc. Further, by using corresponding flanges 330, 338, the physical abutments between them can prevent relative movement, such as sliding, between the display frame 328 and the flanged substrate 103. The securement can increase by incorporating end flanges at the two far ends of the display frame and the flanged substrate. The article may be mounting to the display frame 328 using permanent adhesive, screws, and/or nails. If the article has a wire or cable, such as an electrical cord, the wire or cable may be routed through one of the through holes 342 and run inside the receiving space 344.

To remove the article and the display frame assembly 326 from the base wall surface, the display frame 328 is separated from flanged substrate 103. Then the strips 152 are removed by pulling on the tabs 174 of the straps, as previously discussed. Once the strips 152 have been removed, the substrate 100 separates from the base wall surface.

With reference now to FIGS. 24A and 24B, a shutter-type cover plate 348 is shown. The shutter-type cover plate 348 has a body 350 with a window or opening 352. A shutter 354 is slidably provided with the body 350 and slidable from a first position (FIG. 24A) to a second position (FIG. 24B) to cover the window 352. The window 352 is exposed when the shutter is in the first position and the window is closed or covered when the shutter is in the second position. The shutter 354 can have a set of tracks or rails that slides on a corresponding set of tracks or rails on the body 350 to move between the first position and the second position. The backside or rear surface of the body 350 may be provided with adhesive for attaching the shutter-type cover plate 348 to a mount ready substrate 101 to cover an access opening 104 on the substrate. Alternatively, the body 350 may be provided with tines or tabs for engaging corresponding slots or recesses on the mount ready substrate. In some examples, rather than utilizing tracks or rails, the shutter 354 may be secured to the body 350 via a hinge, such a living hinge or a hinge with a pivotable pin.

FIG. 25 shows a mount ready substrate 101 similar to the mount ready substrate of FIG. 6 having a shutter-type cover plate 348 mounted over one of the access holes 104. In practice, a corresponding number of shutter type cover plates 348 can be used with the access holes 104 on the mount ready substrate 101. The substrate may be used to suspend materials on a base wall surface, as discussed elsewhere, and the one or more shutter type cover plates 348 (FIGS. 24A, 24B) can be incorporated to hide the access openings 104, when moving the shutter 354 from a first position to a second position over the opening 352 for each cover plate.

FIG. 26 is an exploded view of a display frame assembly 350 comprising a substrate 100 and a display frame 352, which are usable together as a combination, as shown in FIG. 27. The present display frame assembly 350 is similar to the display frame assembly of FIGS. 22 and 23 with a few exceptions. In the present embodiment, the display frame 352 is a push pin panel or board 354 having a body 356 configured to receive one or more push pins 358. For example, the body 356 may be made from a gatorboard, from a cork board, or from a foam core material know for receiving push pins. The body 356 may optionally further be provided with one or more strips of magnet elements 180 or one or more magnetizable metal strips 181 to be used with a magnet element 180 or a metal object 183.

FIG. 27 shows the display frame 352 of FIG. 26 assembled with the flanged substrate 103 of FIG. 26. In an example, the display frame 352 can snap fit into the receiving space 362 between the two sidewalls 330, 330 of the flanged substrate 103. Detents, VELCRO, such as hook and loop fasteners, straps, or adhesive may be used to more firmly secure the display frame 352 to the flanged substrate 103. Once assembled, a push pin 358 may be used to suspend an article to the display frame 350, such as by poking a hole with the pin through a piece of paper or a paper ticket and then into the body 356 of the display frame 352. Further, a magnet 180 or a magnetizable metal material 183 may be used to secure an article to the display frame 352, if a magnet strip or a magnetizable strip is incorporated with the body of the display frame 352.

FIGS. 28A and 28B show a front perspective view and a rear perspective view of a spring loaded clip 370, respectively, in accordance with aspects of the present invention. As shown, the clip 370 has a first clip arm 372 and a second clip arm 374 engaged with one another via a mating tabs 376 and a torsion spring 378. The torsion spring 378 pushes or biases the two far ends 380, 380 of the two clip arms 372, 374 together, which can be opened by pushing or squeezing the two push ends 382, 382 together against the force of the torsion spring 378. The first clip arm 372 can have an exposed surface 386 that faces the user when in use. An indicia 388 can be provided as an indicator or to provide notice. For example, a name or a note, such as "Mike" or "Jane", may be provided as the indicia to customize the spring loaded clip 370 to the user. Gripping surfaces 390 may be provided at opposing inner surfaces of the two clip arms 372, 374 to improve gripping of an object located between the two clip arms. In alternative examples, the clip may be a unitarily formed metal paper clip, which uses a leaf spring to generate the biasing force.

FIG. 28B shows the rear perspective view of the spring loaded clip 370. As shown, the exposed surface 386 of the second clip arm 374 is provided with a recessed area 392 having a magnet element 180 located therein. The magnet element 180 may be bonded to the clip arm to more permanently seat within the recessed area 392. As shown, the spring loaded clip 370, with the magnet element 180, is usable with one of the metal substrates 100 and mount ready metal substrates 101 disclosed elsewhere herein. In some examples, the first clip arm 372 can have the magnet element 180 while the second clip arm 374 can have the access hole 104.

In accordance with further aspects of the invention, a spring loaded clip 370, with or without a magnet element, may be provided with an access hole 104. For example, an access hole 104, similar to one of the access holes described elsewhere herein, may be provided through the second clip arm 374 of the clip 370. A double sided adhesive strip can then be applied to the exposed surface 386 of the second clip arm 374 with the tab of the strip aligned to be exposed at the access hole 104, when looking at the opposed surface of the second clip arm 374. With the adhesive strip applied to the exposed surface 386, the clip 370 is converted to a mount ready clip that can be suspended on a base wall surface without requiring the base wall surface to be a magnetizable metal surface and without having to poke or drill a hole through the base wall surface to suspend the clip 370. Instead, the clip 370 with the strip can be suspended in a similar manner as a mount ready substrate described elsewhere herein. Although the shape of the two arms 372, 374 is shown as oblong or generally oval, the shape is not so limited and can embody other shapes, including round or rectangular.

Figure 29A:
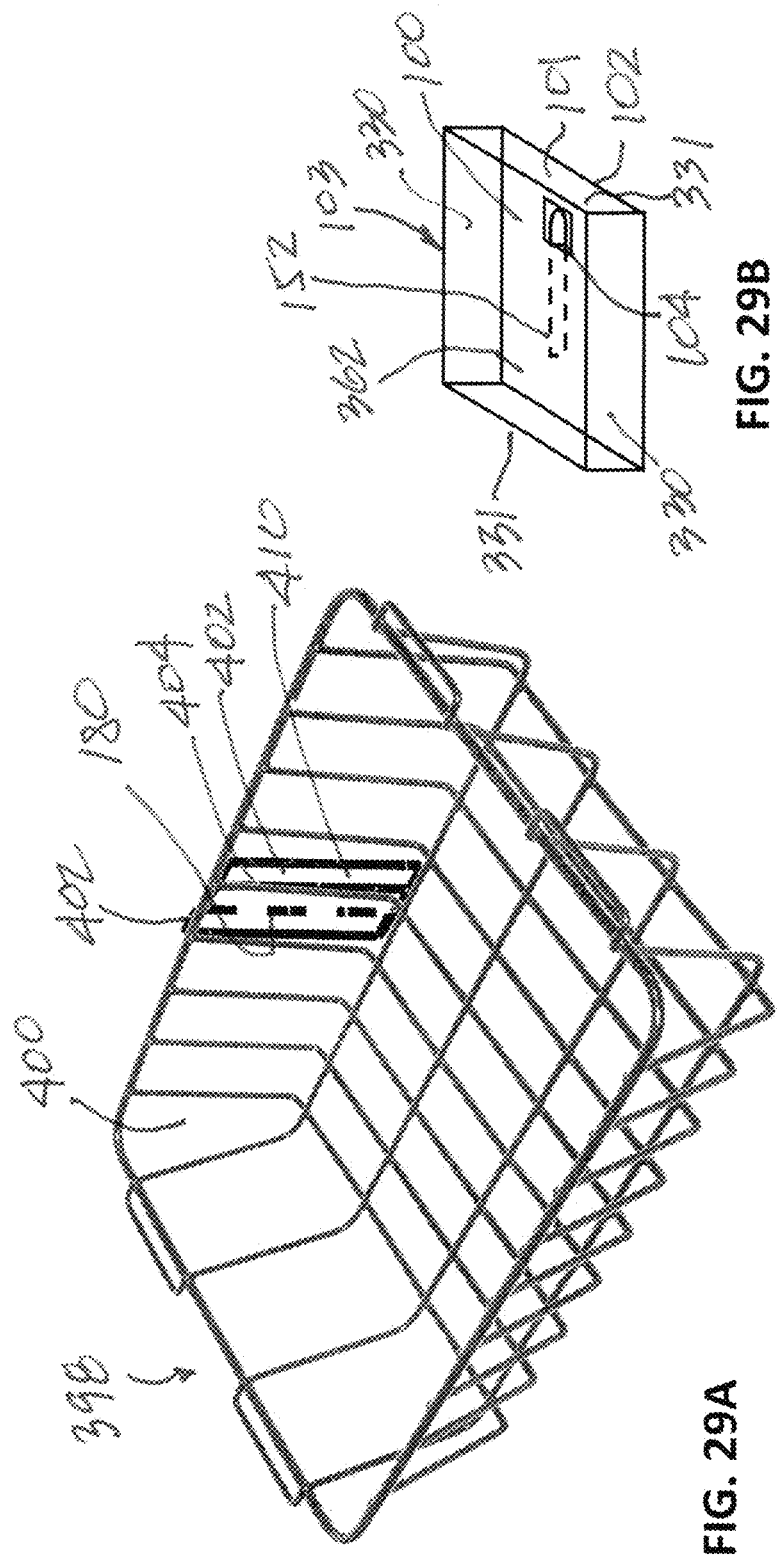
FIG. 29A shows a basket with a mounting bracket usable with the flanged substrate of FIG. 29B.

FIG. 29A shows a basket 398, which can be wire-type basket or made from plastic to include through holes resembling a wire-type basket. The basket 398 can have a plurality of walls defining a storage or receiving space 400 for receiving or storing loose articles, such as to hold coins, key chains, remote controls, or miscellaneous items. The basket 398 can vary in size and weight and should be sized and shaped with consideration for the one or more magnets and the one or more double side adhesive strips used to suspend the basket 398 and its contents.

A mating bracket 402 can be provided with the basket 398, such as with straps or detents. The mating bracket 398 can have a body 404 comprising a plurality of sidewalls 406. One or more magnet elements 180 may be provided with the body 404, such as by bonding or using adhesive to secure the one or more magnet elements to the body 404. The plurality of sidewalls 406 of the mating bracket 402 can define a projection 410 for projecting into a receiving space of a flanged substrate 103, as further discussed below.

Figure 29B:
FIG. 29C is a schematic side view of the basket of FIG. 29A coupled to the flanged substrate of FIG. 29B.

FIG. 29B shows a flanged substrate 103, which is understood to be a substrate 100 with two or more flanges or sidewalls 330, 330, which is further understood to be a mount ready flanged substrate 103 having a strip 152 adhered to a backside surface next to an access opening 104. In the present embodiment, two end walls or flanges 331, 331 are also provided. The two side walls 330, 330 and the two end walls 331, 331, including the body 102 of the substrate, define a receiving space 362 for receiving the projection 410 on the mating bracket 402 located with the basket 398. The basket 398 can therefore be suspended to the mount ready flanged substrate 103 via the positive engagement between the projection 410 and the receiving space 362 and the one or more magnet elements 180 attracted to the metal substrate. The positive engagement allows the basket 398 without sliding relative to the substrate, such as due to the physical abutment between the various sidewalls or flanges. The engagement between the projection 410 and the receiving space 362 may be viewed as a keying system or a paring system, which requires the mating bracket 402 to be sized and shaped to work with the flanged substrate 103, or vice versa.

Figure 29C:
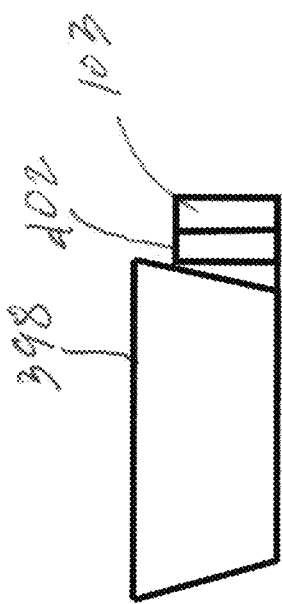

FIG. 29C is a schematic side view of the basket 398 of FIG. 29A mounted to the flanged substrate 103 of FIG. 29B. While the mating bracket 402 has been described with a projection 410 that projects into the receiving space 362 of the flanged substrate 103, in other examples, the two can reverse or each can project into the other.

More broadly, FIGS. 29A-29C may be viewed as an article having a structure, such as a frame or a body, attached to a mounting bracket to define framed mounting bracket, and wherein the framed mounting bracket is attached to a flanged substrate, such as with one or more magnet elements, such as that lateral movement is prevented by the corresponding flanges or sidewalls on the substrate and the mounting bracket.

FIG. 30A shows an LED button light fixture 420 comprising a light housing 422, which has electronic components, a power source, and one or more LEDs 424 stored therein. The LED button light fixture 420 can be pushed to activate the on/off switch to power on or power off the one or more LEDs 424. Light housing can further be provided with one or more magnet elements 180. A substrate 100 is provided with the LED button light fixture 420. A strip 152 can adhere to the substrate 100, with the tab aligned to the access hole 104, and the mount ready substrate 101 mounted to a base wall surface, which can be a wall surface of a home, an office, a cabinet, part of a staircase, etc. In an example, the substrate is made from a metal material and the light fixture 420 can include a magnet element 180 to magnetically attach to the substrate. In another example, the substrate can be made from a non-metallic material and can include detents. The light fixture 420 can include matching or corresponding detents to mate with the detents on the substrate.

FIG. 30B shows the light fixture 420 secured to the substrate 100 and the strip 152 adhered to the backside or rear side surface of the substrate to define an assembled light fixture 421. As shown, two magnet elements 180 are provided with the light housing for magnetic attachment to the substrate. The assembled light fixture 421 can be mounted under a cabinet, as an example, with the one or more LEDs 424 facing downward or facing the ground. In other examples, the assembled light fixture 421 can be mounted in a different orientation.

FIGS. 31A-31C show different substrates 100 and mount ready substrates 101 in accordance with further aspects of the invention. The substrates may be made from a metal material or a non-metallic material, such as plastic. Like, the substrates of FIGS. 8A-8G, each of the substrates 100 has an overall surface area that is larger than the surface area of the strip 152 by only about 1.5 to about 8 times the surface area of the strip and may also be referred to as an individual utility substrate 100" or a single utility mount ready substrate 101". In general, each individual utility substrate 100" has body with an outer perimeter 108 and a cutout 430 at one of the edges of the outer perimeter 108. In an example, the cutout 430 comprises a U-shape recess comprising three connected short edges 432, 434, 436. The cutout 430 disrupts the edge 440 of the perimeter 108 from a single straight line or a single arcuate curve to two straight line sections with a cutout 430 therebetween or to two arcuate curve sections with a cutout 430 therebetween. Said differently, the cutout 430 creates a recess along a section of the outer perimeter 108 of the substrate. Thus, when used with a strip 152, the tab can be recessed from the outer perimeter 108 of the substrate without providing an access hole or opening 104.

The cutout 430 on the substrate should be sufficiently large to expose the tab 174 of a double-sided adhesive strip 152 without having the tab 174 of the strip extending beyond the line or curve at the opening of the cutout. Said differently, the cutout 430 of the present substrate 100 is sufficiently large such that the tab 174 of the strip 152 does not extend beyond an imaginary line or an imaginary arcuate curve at the entrance of the cutout. That is, an imaginary line or imaginary curve is located where the cutout is formed and the tab 174 should not extend further radially outwardly beyond the imaginary line or imaginary curve. The cutout 430 of the present substrate provides the same function as the access opening or hole 104 of the substrate of FIGS. 8A-8G in that the upper exposed surface 106a is flat so that a flat article may be placed thereon without the inconvenience of the tab being located therebetween to create a bump or an uneven surface. In the present embodiment, the outer perimeter 108 has been provided to accommodate the tab 174 without also requiring an inner perimeter or inner opening, radially spaced inwardly from the outer perimeter 108.

FIG. 31A shows a mount ready substrate 101 with an outer perimeter 108 that is generally rectangular and having a cutout 430 on one of the edges 440 of the outer perimeter. FIG. 31B shows a mount ready substrate 101 in which the outer perimeter 108 has an A-frame with a cutout 430 along one of the edges 440. FIG. 31C shows a mount ready substrate 101 with an outer perimeter 108 having a truncated circle to define an edge 440 at the truncated section of the substrate. However, other outer perimeter 108 shapes, such an octagon, may be practiced with a cutout without deviating from the spirit and scope of the invention. Thus, a plurality of individual utility substrates 100", each with a cutout 430, and a plurality of single utility mount ready substrates 101", each with a cutout 430, may be used in place of or in addition to a larger substrate that has a body with two or more access holes 104, each of which having an opening or perimeter that is located inwardly of the outer perimeter 108.

In some examples, a relative larger substrate 100, in terms of surface area, compared to the individual utility substrates 100" of FIGS. 31A-31C may be provided with cutouts 430 instead of or in addition to one or more access holes or openings 104. For example, the substrate 100 of FIG. 7 and the substrate of FIG. 11 may be provided with one or more cutouts 430, similar to the cutouts of FIGS. 31A-31C, in addition to the access holes 104 or instead of the access holes provided with these relatively larger substrates. If so provided, double-sided adhesive strips 152 may be used as described with reference to FIGS. 31A-31C.

In some examples, flanges or sidewalls may be incorporated with the substrates of FIGS. 31A, 31B, similar to the sidewalls and flanges of FIGS. 22, 23, 26, 27, and 29B. In incorporated, these substrates will be known as flanged substrates 103. Each flange substrate 103 can define a receiving space for receiving a projection from a mating bracket, as previously discussed.

With reference now to FIG. 32A, an exemplary alternative substrate 100 and exemplary mount ready substrate 101, with a strip 152, in accordance with aspects of the invention is shown. The present substrate is similar to other substrates discussed elsewhere herein, such as the substrates of FIGS. 8A-8F, with a few exceptions. In the present embodiment, the substrate 100 has a body 102, a single access opening 104, and a relative size between the substrate surface area and the surface area of the strip 152 of about 1.5 times to about 8 times the surface area of the strip and therefore may be considered a single or individual utility substrates 100" and a single or individual utility mount ready substrates 101". The body 102 can be made from a metallic material or a non-metallic material. The access opening 104 can have a different shape than as shown, but preferably with at least one straight edge that is aligned with where the tab of a double-side adhesive strip 152 is to be placed, as previously discussed. In the present embodiment, the outer perimeter 108 is provided with one or more pairing features 450, which are unique edge features that can only fit or mate to a bracket or article having corresponding edge features. A pairing feature 450 is understood as a structure formed with the body 102 of the substrate that requires a corresponding or matching feature on a mating flange or bracket that attaches to the substrate or mount ready substrate, as further discussed below.

The outer perimeter 108 with the paring features 450 may be referred to as an outer contoured perimeter 452. The outer contoured perimeter 452 has at least one projection 454 that extends radially outwardly of the contour of the normal outer perimeter 108 or at least one notch or channel 456 recessed from the contour of the normal outer perimeter 108. Optionally, a pairing feature can have both a projection and a notch, called a complex pairing feature 458. The notch or channel 456 of the pairing feature is generally different than a cutout 430 for accommodating a tab 174 of a strip 152. In an example, a mount ready substrate 101 with an outer contoured perimeter 452 may have more, less, and/or different paring features 450 than as shown. Further, the normal outer perimeter 108 may be other than rectangular, such as round, square, oval, or other shaped polynomials.

FIG. 32B shows an alternative substrate 100 with a contoured outer perimeter 452, which is understood as a substrate with a normal outer perimeter 108 with at least one paring feature 450. Aspects of the present substrate are similar to the substrate discussed with reference to FIG. 32A, with at least one exception. In the present embodiment, a cutout 430 can be provided for accommodating a tab 174 of a double sided adhesive strip 152, similar to of FIGS. 31A-31C. With the cutout 430, the access hole or opening 104 with the inner perimeter 109, located radially inwardly of the outer perimeter 108, may be omitted.

Thus, an aspect of the present invention is understood to include a substrate having a body with an outer contoured perimeter having at least one projection that extends radially outwardly of the contour of the normal outer perimeter, at least one notch or channel recessed from the contour of the normal outer perimeter, or at least one complex paring feature with both a projection and a notch. At least one projection that extends radially outwardly of the contour of the normal outer perimeter, at least one notch or channel recessed from the contour of the normal outer perimeter, or at least one complex paring feature with both a projection and a notch maybe referred to as at least one pairing or keying feature.

The normal perimeter can be the perimeter of an individual or single utility substrate discussed elsewhere herein. The body of the substrate with the outer contour perimeter can be made from a metal material or a non-metal material. The outer contour perimeter of the substrate is configured of align or couple to a mounting bracket, which can be part of a frame or an article, and the mounting bracket having an opening with a corresponding shape for coupling with the outer contour perimeter of the substrate.

In an example, a substrate having a body with an outer perimeter and a generally planar surface can have at least one pairing or keying feature and wherein the substrate with the at least one pairing or keying feature can fit within an opening of a mating bracket having a corresponding paring or keying feature for receiving the at least one paring or keying feature of the substrate. The substrate can include an access hole with an inner perimeter or a cutout along an edge of the outer perimeter.

In another example, the substrate can have a body with an outer perimeter and a generally planar surface. The body can have at least one access hole, at least one cutout along an edge of the outer perimeter, or combinations thereof. The body of the substrate can further include a keyed or paired opening having a unique shape. For example, the body can include a unique cutout or hole with a contour perimeter, different or apart from the access hole and/or cutout along the edge of the perimeter. An article having a mounting bracket can have a male projection that fits within or projects into the unique cutout of the substrate so that the article, such as a basket, or mounting rack, a shelf, can be keyed or paired with the substrate and a different article without the mounting bracket without the pairing or keying feature cannot couple to the substrate.

With reference now to FIG. 33A, a mount ready substrate 101 having a pairing feature 450 in the form of a projection 454 is shown, which defines a contoured outer perimeter 452. The mount ready substrate 101 can be mounted on a base wall surface, such as a wall surface of a home, an office, a kitchen, etc., without physically altering the surface, such as by nailing or screwing into the wall. The substrate 100 may be made from a metal material and usable with a magnet. In some examples, the substrate 100 may be provided with flanges or sidewalls and a receiving space, making the substrate a flanged substrate 103.

An article 460 is shown comprising a body 462 with a mounting bracket 464 is shown. The mounting bracket 464 can be secured to the body 462 of the article 460, which can embody any number of articles, such as a picture frame, a wall decoration, a plastic or wire basket, a sconce, a shelve, etc. The mounting bracket 464 can have an outer perimeter 108 with a pairing feature 450, which can be a projection 454, thereby defining a contoured outer perimeter 452. In an example, the mounting bracket 464 can further include sidewalls or flanges on at least two of the edges 440 that define the outer perimeter 108, thereby defining a flanged mounting bracket 465. Further the flange mounting bracket 465 has a mating or corresponding contour as the contoured outer perimeter 452 of the flanged substrate 103 of FIG. 33A such that when the article 460 is placed over the flanged substrate 103 of FIG. 33A, the projection is received by the receiving space of FIG. 33A. Alternatively, the flanged substrate 103 can project into the receiving space of the flanged mounting bracket 465. The pairing feature 450 of the mounting bracket 464 and the pairing feature 450 of the substrate mate or match, thus ensuring proper fit and orientation between the two when coupled.

In some examples, the substrate 100 of FIG. 33A can include more than one pairing feature 450. For example, two or more pairing features can include a projection, a recess, a complex pairing feature with both a projection and a recess, and combinations thereof. The mounting bracket 464 usable with the substrate of FIG. 33A can have a corresponding shape for mating or coupling with the substrate.

Figure 34:
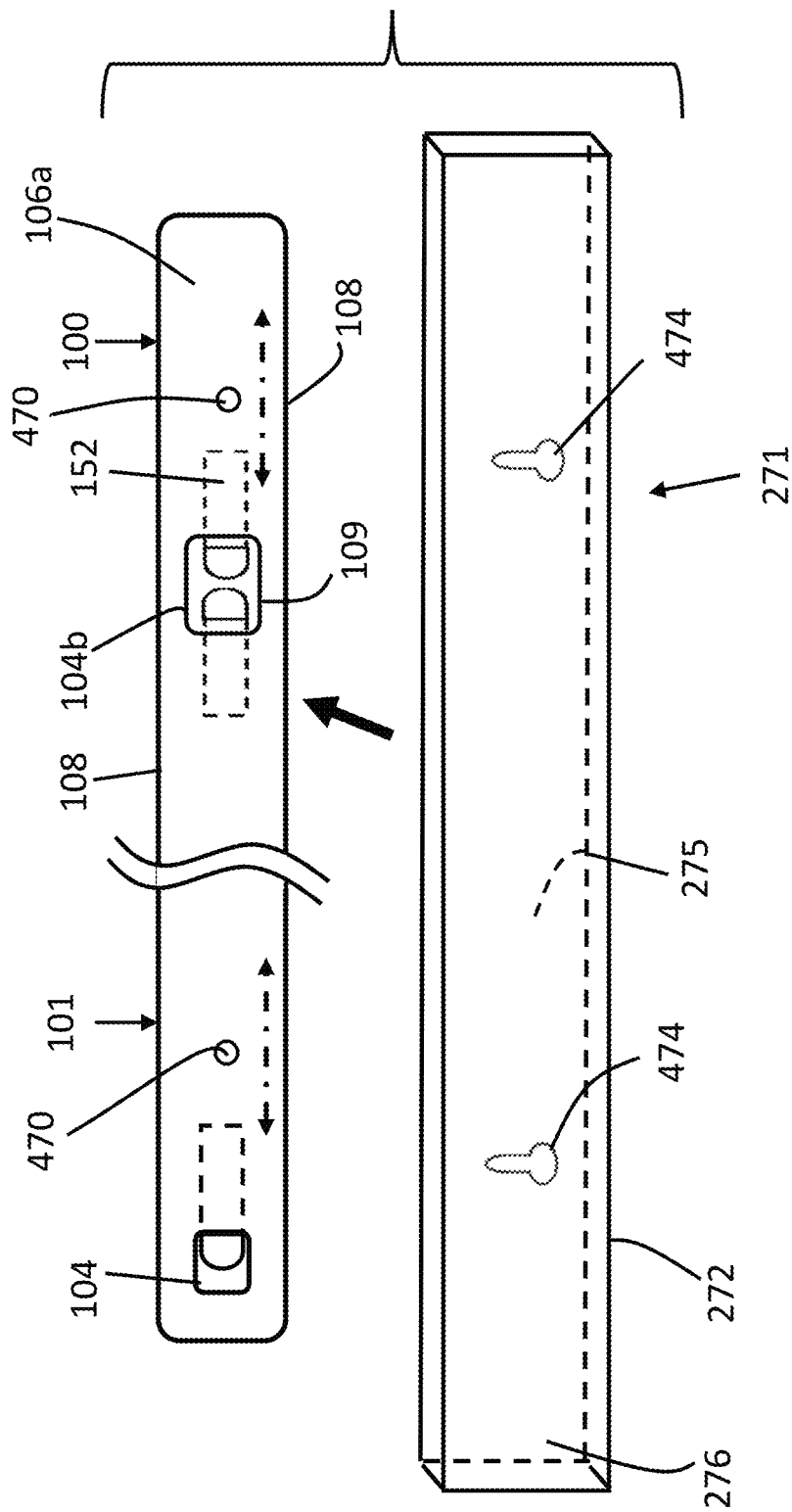
FIG. 34 shows a mount ready substrate and a mounting rack that can couple without magnetism.

With reference now to FIG. 34, a mount-ready substrate 101 mounted to a wall surface (not shown) via a plurality of strips 152, similar to the mount ready substrate of FIG. 15 and elsewhere is shown. The substrate can be made from a metal or a non-metallic material. In an example, the wall surface can be a granite surface of a kitchen and the mount-ready substrate is attached to the granite surface, without any nailing or drilling. Alternatively, the surface can be any surface that cannot be punctured or that the user does not want to puncture, such as a shower stall or a non-magnetic stainless steel surface, such as a refrigerator made with 316 SS material. The mount ready substrate can have one or more access holes 104 each with an inner perimeter 109 located inwardly or an outer perimeter 108 or a cutout 430 similar to the cutouts shown in FIGS. 31A-31C.

In the present embodiment, at least two spaced apart mounting pins 470 are provided, projecting outwardly from the exposed or exterior side 106a of the substrate. The mounting pins 470 can embody any number of pin-like structures, such as a dowel pin, a nail, a screw, an elongated rod, etc. The purpose of the pins 470 are to project into corresponding mounting holes 474 on a mounting rack, which can be without a magnet element. In other words, the present embodiment includes a mount ready substrate 101 that can be non-destructively attached to a wall surface and wherein a mounting rack can attach to the mount ready substrate without any magnet or magnet element.

The mounting rack 271 of the present embodiment can embody any number of shapes, such as a rectangular prism with a body 272 having a front surface 276 and a rear or back surface 275 opposing the front surface. The mounting rack 270 can made from a pressed board or a push pin panel for use with push pins, from plastic, from a wood material, or can embody any number of articles. The rear surface 275 of the body can be provided with at least two mounting holes 474, similar to mounting holes provided with electrical power strips. To attach the mounting rack 271 to the mount ready substrate, the two mounting holes 474, 474 can be placed onto the two mounting pins 470 on the mount ready substrate and then allowed to slide into the narrow part of each corresponding mounting hole. Thus, the mounting rack 271 can attach to the wall surface by attaching to the mount ready substrate without having to destructively alter the wall surface, such as with a nail or a screw.

In some examples, the two mounting pins 470 on the substrate can be adjustable, such as slidable within a set of tracks, to adjust the width or gap between them for mounting or for coupling with the two mounting holes 474 on the mounting rack. As shown in FIG. 34, the adjustability of the mounting pins are shown schematically with the two double headed arrows under each of the two pins. In other examples, the pins 470 can be provided separately from the body of the substrate and then the pins can attach to the substrate by adhesive or bonding as necessary to fit with the spacing of the two mounting holes 474.

In some instances, a mounting plate (not shown) having a mounting hole 474 formed therewith may be attached to the body 272 of the mounting rack 271 instead of unitarily forming the mounting hole with the body of the mounting rack. Thus, in the example shown, two mounting plates each with a mounting hole 474 may be secured to the body of the mounting rack 271, such as by adhesive, screws, fasteners, VELCRO, etc., for attaching to the substrate 100 having the mounting pins 470.

Numerous substrates and mount ready substrates as well as applications of the substrates have been described. It is contemplated and considered part of the invention for features of an embodiment to be adopted for use with another embodiment. For example, while no magnet is used with the mounting rack of FIG. 34, the front surface 276 of the mounting rack can be provided with a magnet strip or a metal sheet that a magnet can attach to, such as shown in FIG. 27. Adaptations of features from different embodiments are contemplated unless doing so causes conflict and defects in the overall design that prevent the alternations.

Methods of making and of using the substrates, mount ready substrates, kits, and related components are within the scope of the present invention. Further, unless the context indicates otherwise, features discussed for one embodiment may be incorporated in other disclosed embodiments unless their incorporation defeats or degrades the manner in which they can be used.

Although limited embodiments of the substrates, mount ready substrates, kits, and their components have been specifically described and illustrated herein, many modifications and variations will be apparent to those skilled in the art. Accordingly, it is to be understood that the substrates, mount ready substrates, kits, and their components constructed according to principles of the disclosed devices, systems, and methods may be embodied other than as specifically described herein. The disclosure is also defined in the following claims.

What is claimed is:

1. A substrate configured to non-destructively attach on a wall surface, said substrate comprising:
   a body having a shape and an outer perimeter with edges having fixed lengths defining the shape of the body, the body is generally planar and having an exposed surface and a backside surface opposing the exposed surface, the body being sized and shaped for use with an electrical power strip having two spaced apart receiving slots, including a first receiving slot and a second receiving slot, that are spaced from one another by a first distance;
   (1) an access hole located within the outer perimeter, said access hole comprising an inner perimeter, inward of the outer perimeter, having a maximum width and a maximum height along an X-Y plane, or (2) a through cutout formed along one of the edges of the outer perimeter to define a recessed space having a maximum width and a maximum height along an X-Y plane;
   two spaced apart mounting pins projecting from within the outer perimeter and away from the exposed surface of the generally planar body, the two spaced apart pins comprising a first mounting pin and a second mounting pin spaced from one another by a second distance and wherein the second distance and the first distance are approximately equal to facilitate insertion of the first mounting pin into the first receiving slot and the second mounting pin into the second receiving slot when mounting the electrical power strip to the body;
   wherein when the body has the access hole and when the substrate is used with a double-sided adhesive strip, the maximum width and the maximum height of the inner perimeter are sufficiently large for retrieving a tab with an end edge of the double-sided adhesive strip adhered to the backside surface of the substrate; and
   wherein in a mounted position on a wall surface, no part of the body extends rearward of the backside surface beyond a thickness of the double-sided adhesive strip.

2. The substrate of claim 1, wherein the two spaced apart pins are movable relative to the body.

3. The substrate of claim 2, wherein the two spaced apart pins are movable relative to one another.

4. The substrate of claim 3, wherein the access hole is a first access hole and further comprising a second access hole spaced from the first access hole, or the through cutout is a first through cutout and further comprising a second through cutout spaced from the first through cutout.

5. The substrate of claim 4, further comprising a first double-sided adhesive strip adhered to the body and a second double-sided adhesive strip adhered to the body.

6. The substrate of claim 1, further comprising an electrical power strip attached to the body, and wherein the two spaced apart mounting pins project into the two spaced apart receiving slots on the electrical power strip.

7. The substrate of claim 1, further comprising a product package having an interior and the substrate and one or more double-sided adhesive strips are located in the interior of the product package.

8. The substrate of claim 2, further comprising a product package having an interior and the substrate and two or more double-sided adhesive strips are located in the interior of the product package.

9. The substrate of claim 6, wherein the body comprises the through cutout, which is a first through cutout, wherein the body comprises a second through cutout spaced from the first through cutout, and wherein a first double-sided adhesive strip having a first pull tab is adhered to the body with the first pull tab exposed at the first through cutout and a second double-sided adhesive strip having a second pull tab is adhered to the body with the second pull tab exposed at the second through cutout.

10. The substrate of claim 1, wherein the body has a length and a width and the electrical power strip has a length and a width, and wherein length of the body is aligned with the length of the electrical power strip when mounting the electrical power strip to the body.

11. A substrate configured to non-destructively attach on a wall surface and supporting an electrical power strip, said substrate comprising:
   a body having an outer perimeter defining a shape of the body, an exposed surface, and a backside surface opposing the exposed surface, and wherein the outer perimeter having a plurality of edges;
   two spaced mounting pins projecting from within the outer perimeter and outwardly away from the exposed surface, the two spaced apart mounting pins including a first mounting pin and a second mounting pin;
   the electrical power strip comprising a body having two spaced apart mounting holes, which include a first mounting hole and a second mounting hole;
   wherein the first mounting pin projects into the first mounting hole and the second mounting pin projects into the second mounting hole; and
   wherein when in a mounted position on a wall surface, no part of the body extends rearward of the backside surface beyond a thickness of a double-sided adhesive strip.

12. The substrate of claim 11, further comprising a first double-sided adhesive strip having a first pull tab adhered to the body and the first pull tab projecting outwardly away from the outer perimeter, and a second double-sided adhesive strip having a second pull tab adhered to the body and the second pull tab projecting outwardly away from the outer perimeter and spaced from the first pull tab.

13. The substrate of claim 11, further comprising a first double-sided adhesive strip having a first pull tab adhered to the body and the first pull tab exposed at a first access hole formed through the body, and a second double-sided adhesive strip having a second pull tab adhered to the body and the second pull tab exposed at a second access hole from through the body.

14. The substrate of claim 11, wherein the first mounting pin is movable relative to the second mounting pin.

15. The substrate of claim 11, further comprising:
(1) an access hole located within the outer perimeter, said access hole comprising an inner perimeter, inward of the outer perimeter, having a maximum width and a maximum height, or (2) a through cutout formed along one of the plurality of edges of the outer perimeter to define a recessed space having a maximum width and a maximum height.

16. The substrate of claim 11, wherein the body has a width and a height, and wherein a first pull tab of a first double-sided adhesive strip is exposed at the height of the body, and a second pull tab of a second double-sided adhesive strip is exposed at the height of the body and spaced from the first pull tab.

17. The substrate of claim 11, further comprising a magnet attached to the body.

18. The substrate of claim 11, wherein the body is made from a metal or a non-metallic material.

19. The substrate of claim 11, wherein the body has a length and a width and the electrical power strip has a length and a width, and wherein length of the body is aligned with the length of the electrical power strip.

20. A method of mounting a substrate to a wall surface and mounting an electrical power strip to the substrate, said method comprising:
adhering a body of the substrate to a wall surface with a first double-sided adhesive strip and a second double-sided adhesive strip, said body having an outer perimeter defining a shape of the body, a first mounting pin, a second mounting pin, an exposed surface, and a backside surface opposing the exposed surface, and wherein the outer perimeter of the body having a plurality of edges;
projecting the first mounting pin into a first mounting hole on a body of the electrical power strip and the second mounting pin into a second mounting hole on the body of the electrical power trip, the first and second mounting pins projecting from within the outer perimeter and outwardly away from the exposed surface of the body of the substrate; and
wherein in a mounted position on the wall surface, no part of the body extends rearward of the backside surface beyond a thickness of the first and second double-sided adhesive strips.

21. The method of claim 20, further comprising aligning a first pull tab of the first double-sided adhesive strip to a first access hole formed through the body of the substrate and aligning a second pull tab of the second double-sided adhesive strip to a second access hole formed through the body of the substrate.

22. The method of claim 20, further comprising aligning a first pull tab of the first double-sided adhesive strip to a first edge of the body of the substrate and aligning a second pull tab of a second double-sided adhesive strip to a second edge of the body of the substrate.

23. The method of claim 20, wherein the body has a length and a width and the electrical power strip has a length and a width, and wherein length of the body is aligned with the length of the electrical power strip.

* * * * *